United States Patent
Forutanpour et al.

(10) Patent No.: US 8,818,027 B2
(45) Date of Patent: Aug. 26, 2014

(54) COMPUTING DEVICE INTERFACE

(75) Inventors: Babak Forutanpour, San Diego, CA (US); Jianfeng Ren, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 418 days.

(21) Appl. No.: 13/013,657

(22) Filed: Jan. 25, 2011

(65) Prior Publication Data

US 2011/0243380 A1    Oct. 6, 2011

Related U.S. Application Data

(60) Provisional application No. 61/320,158, filed on Apr. 1, 2010.

(51) Int. Cl.
| | |
|---|---|
| G06K 9/36 | (2006.01) |
| G06K 9/46 | (2006.01) |
| G06F 3/033 | (2013.01) |
| G06F 3/048 | (2013.01) |
| G06F 3/01 | (2006.01) |
| G06K 9/00 | (2006.01) |
| G06T 7/20 | (2006.01) |
| G06F 3/041 | (2006.01) |
| G06F 3/0346 | (2013.01) |
| G06F 3/042 | (2006.01) |
| G06K 9/20 | (2006.01) |

(52) U.S. Cl.
CPC ....... *G06F 3/017* (2013.01); *G06T 2207/30196* (2013.01); *G06T 2207/10016* (2013.01); *G06K 9/00355* (2013.01); *G06T 7/204* (2013.01); *G06F 3/0418* (2013.01); *G06F 3/0346* (2013.01); *G06K 9/2036* (2013.01); *G06F 3/0425* (2013.01)

USPC ........... 382/103; 382/181; 382/209; 382/217; 345/156; 345/157; 345/175; 345/181; 345/182

(58) Field of Classification Search
CPC . G06K 9/00355; G06K 9/00375; G06K 9/38; G06T 7/0079; G06T 2207/20148; H04N 1/00381; G06F 3/017
USPC .......... 382/103, 181, 209, 217; 345/156, 157, 345/175, 181, 182
See application file for complete search history.

(56) References Cited

U.S. PATENT DOCUMENTS

| | | | | |
|---|---|---|---|---|
| 5,936,615 A | * | 8/1999 | Waters | 345/173 |
| 6,414,672 B2 | * | 7/2002 | Rekimoto et al. | 345/173 |

(Continued)

FOREIGN PATENT DOCUMENTS

| | | |
|---|---|---|
| EP | 2124139 A1 | 11/2009 |
| EP | 2124139 A1 * | 11/2009 |

(Continued)

OTHER PUBLICATIONS

Barczak, et al. "Real-time Hand Tracking using a set of Cooperative Classifiers Based on Haar-like Features." Res. Lett. Inf. Math. Sci.. 7. (2005): 29-42. Print.*

(Continued)

*Primary Examiner* — Michael A Newman
(74) *Attorney, Agent, or Firm* — Heejong Yoo

(57) ABSTRACT

A computing device configured for providing an interface is described. The computing device includes a processor and instructions stored in memory. The computing device projects a projected image from a projector. The computing device also captures an image including the projected image using a camera. The camera operates in a visible spectrum. The computing device calibrates itself, detects a hand and tracks the hand based on a tracking pattern in a search space. The computing device also performs an operation.

52 Claims, 16 Drawing Sheets

FIG. 3

(56) References Cited

U.S. PATENT DOCUMENTS

| | | | |
|---|---|---|---|
| 6,545,670 | B1* | 4/2003 | Pryor .......................... 345/173 |
| 6,600,480 | B2 | 7/2003 | Natoli |
| 6,624,833 | B1 | 9/2003 | Kumar et al. |
| 7,379,563 | B2 | 5/2008 | Shamaie |
| 7,701,439 | B2* | 4/2010 | Hillis et al. ................... 345/156 |
| 8,115,732 | B2* | 2/2012 | Wilson et al. ................. 345/156 |
| 2002/0037101 | A1 | 3/2002 | Aihara |
| 2003/0063260 | A1 | 4/2003 | Nishimura et al. |
| 2004/0005924 | A1 | 1/2004 | Watabe et al. |
| 2004/0189720 | A1 | 9/2004 | Wilson et al. |
| 2004/0190776 | A1* | 9/2004 | Higaki et al. ................. 382/190 |
| 2005/0122308 | A1 | 6/2005 | Bell et al. |
| 2006/0119798 | A1* | 6/2006 | Huddleston et al. ............ 353/42 |
| 2006/0188849 | A1 | 8/2006 | Shamaie |
| 2006/0192782 | A1* | 8/2006 | Hildreth ........................ 345/473 |
| 2007/0182823 | A1 | 8/2007 | Maruyama et al. |
| 2007/0216644 | A1 | 9/2007 | Nam et al. |
| 2008/0150890 | A1 | 6/2008 | Bell et al. |
| 2009/0027337 | A1* | 1/2009 | Hildreth ........................ 345/158 |
| 2009/0103780 | A1* | 4/2009 | Nishihara et al. ............. 382/103 |
| 2009/0115721 | A1 | 5/2009 | Aull et al. |
| 2009/0167682 | A1 | 7/2009 | Yamashita et al. |
| 2009/0315740 | A1* | 12/2009 | Hildreth et al. ................ 341/20 |

FOREIGN PATENT DOCUMENTS

| | | |
|---|---|---|
| JP | 2002101422 A | 4/2002 |
| JP | 2008529135 A | 7/2008 |
| WO | WO9859312 A1 | 12/1998 |
| WO | WO0103106 A1 | 1/2001 |
| WO | WO0159975 A2 | 8/2001 |
| WO | WO0207839 | 1/2002 |
| WO | 2005104010 A2 | 11/2005 |
| WO | WO2006078996 | 7/2006 |
| WO | WO2009031633 A1 | 3/2009 |
| WO | WO2010011923 | 1/2010 |

OTHER PUBLICATIONS

Hall, et al. "Tracking Fingers and Hands with a Rigid Contour Model in an Augmented Reality." 1st International Workshop on Managing Interactions in Smart Environments. (1999): 1-10. Print.*

Barczak et al. "Real-time Hand Tracking using a set of Cooperative Classifiers Based on Haar-like Features." Res. Lett. Inf. Math. Sci.. 7. (2005): 29-42. Print.*

Licsar, et al. "Hand Gesture Recognition in Camera-Projector System." HCI/ECCV 2004, LNCS. 3058. (2004): 83-93. Print.*

Panin, et al. "Real-Time Articulated Hand Detection and Pose Estimation." LCNS—Advances in Visual Computing. 5876. (2009): 1131-1140. Print.*

Cui, et al. "Hand Segmentation Using Learning-Based Prediction and Verification for Hand Sign Recognition." IEEE CVPR. (1996): 88-93. Print.*

Cui, et al. "Appearance-Based Hand Sign Recognition from Intensity Image Sequences." Computer Vision and Image Understanding. 78.2 (2000): 157-176. Print.*

International Search Report and Written Opinion—PCT/US2011/031030—ISA/EPO—Apr. 17, 2012.

Kölsch, M., Turk, M., & Höllerer, T. "Vision-based interfaces for mobility," 1st IEEE International Conference on Mobile and Ubiquitous Systems: Networking and Services, pp. 86-94, Boston, MA, 2004.

Nguyen Dang Binh, Enokia Shuchi and Toshiaki Ejima, "Real-Time Hand Tracking and Gesture Recognition System," Proceedings of International Conference on Graphics, Vision and Image Processing (GVIP-05), pp. 362-368, Dec. 2005.

Christian von Hardenberg and Francois Berard, "Bare-Hand Human-Computer Interaction," Proceedings of the ACM Workshop on Perceptive User Interfaces, Nov. 2001.

Attila Licsár and Tamás Szirányi, "Hand Gesture Recognition in Camera-Projector System," Computer Vision in Human-Computer Interaction, pp. 83-93, 2004.

Paul Viola and Michael Jones, "Rapid object detection using a boosted cascade of simple features," IEEE conference on computer vision and pattern recognition, vol. 1, pp. I-511-I-518, 2001.

Martin Haker, Martin Bohme, et al., "Deictic Gestures With a Time-of-Flight Camera," The 8th International Gesture Workshop, 2009.

Andrew Wilson, "PlayAnywhere: a compact interactive tabletop projection-vision system," Proceedings of the 18th annual ACM symposium on User interface software and technology.

Shahzad Malik and Joe Laszlo, "Visual Touchpad: A Two-handed Gestural Input Device," Proceedings of the 6th international conference on Multimodal interfaces, pp. 289-296, 2004.

Robert Wang and Jovan Popovic, "Real-Time Hand-Tracking with a Color Glove," ACM Transactions on Graphics, vol. 28, No. 3, Article 63, Aug. 2009.

Pranav Mistry and Patty Maes, "SixthSense—A Wearable Gestural Interface" In the Proceedings of SIGGRAPH Asia 2009, Sketch, Yokohama, Japan, 2009.

Rainer Lienhart and Jochen Maydt, "An Extended Set of Haar-like Features for Rapid Object Detection," IEEE ICIP 2002, vol. 1, pp. 900-903, Sep. 2002.

Jianfeng Ren, Nasser Kehtarnavaz, and Leo Estevez, "Real-Time optimization of Viola-Jones face detection for mobile platforms," Proceedings of Seventh IEEE Dallas Circuits and Systems Workshop, pp. 1-4, Oct. 2009.

Barczak, et al., "Real-time Hand Tracking using a set of Cooperative Classifiers Based on Haar-like Features," Res. Lett. Inf. Math. Sci.. vol. 7, 2005, pp. 29-42, Print.

Hall, D., et al., "Tracking Fingers and Hands with a Rigid Contour Model in an Augmented Reality," 1st International Workshop on Managing Interactions in Smart Environments, Dec. 13-14, 1999, pp. 1-10, Print.

* cited by examiner

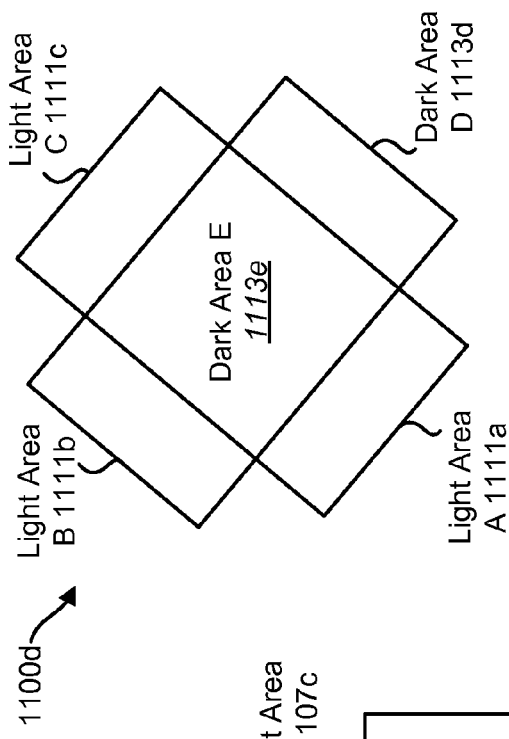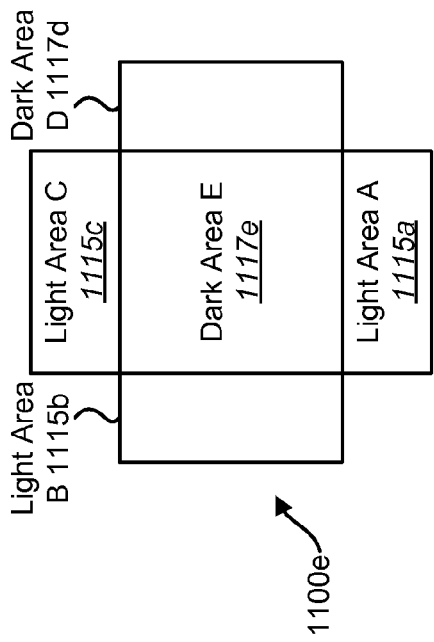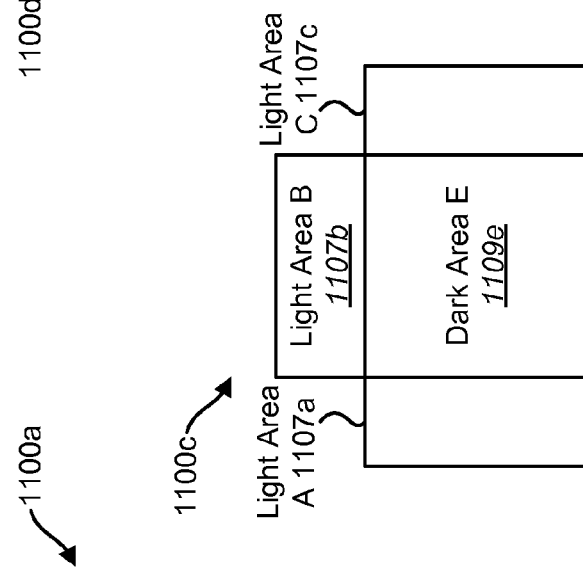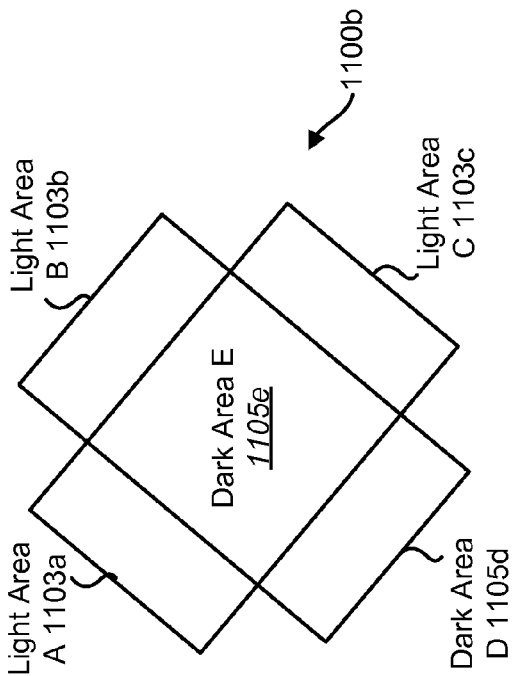

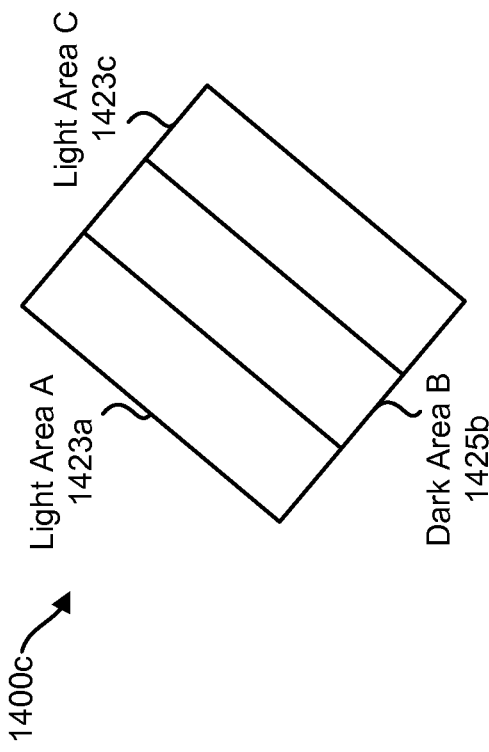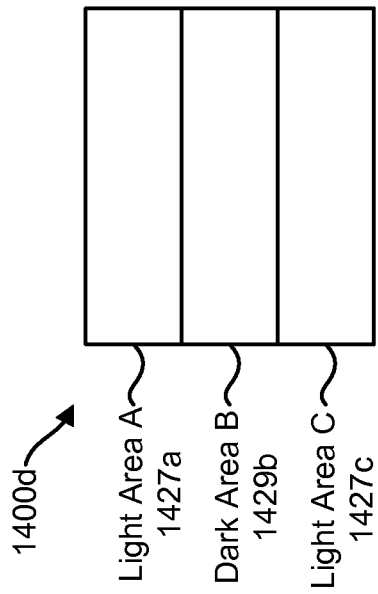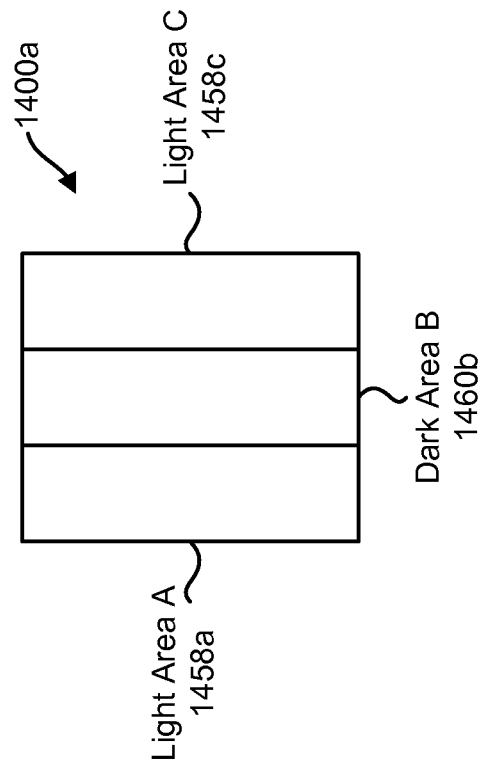

COMPUTING DEVICE INTERFACE

RELATED APPLICATIONS

This application is related to and claims priority from U.S. Provisional Patent Application Ser. No. 61/320,158 filed Apr. 1, 2010, for "A COMPUTING DEVICE INTERFACE USING A PROJECTED IMAGE."

TECHNICAL FIELD

The present disclosure relates generally to electronic devices. More specifically, the present disclosure relates to a computing device interface.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Many electronic devices use one or more interfaces during operation. For example, computers often use a keyboard and mouse to obtain user input for interaction. Other electronic devices use touchscreens and/or touchpads to obtain user input for interaction. Many of these interfaces require direct physical interaction with a piece of hardware. For example, a user must type on a keyboard in order to input text or commands via the keyboard. A user must physically move and/or push one or more buttons on a mouse to interact with a computer via the mouse.

In some cases, directly interacting with a piece of hardware to provide input or commands to a computing device may be inconvenient or less than optimal. For example, it may be inconvenient for a user giving a projected presentation to return to a computer every time interaction is desired. Furthermore, carrying an interface device such as a mouse or wand while giving a presentation may be inconvenient when a user must provide input by pressing a directional pad or when the user is unfamiliar with how to operate the interface device. As illustrated by this discussion, improved systems and methods that provide a computing device interface may be beneficial.

SUMMARY

A computing device configured for providing an interface is disclosed. The computing device includes a processor and instruction stored in memory. The computing device projects a projected image from a projector and captures an image using a camera. The camera operates in a visible spectrum. The computing device calibrates itself and detects a hand. The computing device also tracks the hand based on a tracking pattern in a search space and performs an operation.

Calibrating the computing device may include finding corners of the projected image and mapping coordinates of the projected image to a desktop space. Calibrating the computing device may include determining a hand size. The hand size may be determined based on the projected image, where the projected image includes a plurality of ellipses. The hand size may be determined based on facial recognition. The hand may be detected in an initial interaction area.

The computing device may further track a body and move the initial interaction area based on tracking the body. The computing device may further determine that the tracking pattern is matched to a hand. The computing device may further dynamically change the search space based on a motion of the hand. The tracking pattern may include a rectangular center dark region adjoined on three sides by rectangular light outer regions and adjoined on one side by a rectangular dark outer region.

The operation may be performed based on tracking the hand. The computing device may further recognize a hand gesture based on a gesture pattern. Recognizing a hand gesture may include determining whether a tracked hand has stopped moving for a period of time and scaling a tracked hand image to a fixed size. The gesture pattern may include a rectangular center dark region adjoined on two sides by rectangular light outer regions.

The computing device may further perform an operation based on the recognized hand gesture. The computing device may further perform an operation when the hand gesture is recognized for a percentage of a number of frames.

The hand gesture may be recognized based on an angle between a thumb and index finger and the computing device may further move a cursor away from the hand based on the angle between the thumb and index finger.

The computing device may further illuminate the projected image more brightly in a region around a hand. The computing device may further track a plurality of hands. The computing device may further recognize a plurality of hand gestures. The computing device may further remove dark portions of the image before tracking the hand to avoid tracking a shadow of the hand. The computing device may further provide improved focus and exposure of the image in an area of the projected image. The operation may release a cursor.

A method for providing an interface is also disclosed. The method includes projecting a projected image from a projector and capturing an image using a camera. The camera operates in a visible spectrum. The method also includes calibrating a computing device and detecting a hand. The method also includes tracking the hand based on a tracking pattern in a search space and performing an operation.

A computer-program product for providing an interface is also disclosed. The computer-program product includes a non-transitory tangible computer-readable medium with instructions. The instructions include code for causing a computing device to project a projected image from a projector and capture an image using a camera. The camera operates in a visible spectrum. The instructions also include code for causing the computing device to calibrate the computing device and detect a hand. The instructions also include code for causing the computing device to track the hand based on a tracking pattern in a search space and perform an operation.

An apparatus for providing an interface is also disclosed. The apparatus includes means for projecting a projected image from a projector and capturing an image using a camera. The camera operates in a visible spectrum. The apparatus also includes means for calibrating the computing device and detecting a hand. The apparatus also includes means for tracking the hand based on a tracking pattern in a search space and performing an operation.

BRIEF DESCRIPTION OF THE DRAWINGS

FIG. 11A illustrates one example of a Haar pattern that may be used according to the systems and methods disclosed herein;

FIG. 11B illustrates another example of a Haar pattern that may be used according to the systems and methods disclosed herein;

FIG. 11C illustrates another example of a Haar pattern that may be used according to the systems and methods disclosed herein;

FIG. 11D illustrates another example of a Haar pattern that may be used according to the systems and methods disclosed herein;

FIG. 11E illustrates another example of a Haar pattern that may be used according to the systems and methods disclosed herein;

FIG. 14A is a diagram illustrating one example of a Haar pattern that may be used in accordance with the systems and methods disclosed herein;

FIG. 14B is a diagram illustrating another example of a Haar pattern that may be used in accordance with the systems and methods disclosed herein;

FIG. 14C is a diagram illustrating another example of a Haar pattern that may be used in accordance with the systems and methods disclosed herein;

FIG. 14D is a diagram illustrating another example of a Haar pattern that may be used in accordance with the systems and methods disclosed herein;

DETAILED DESCRIPTION

Figure 1:
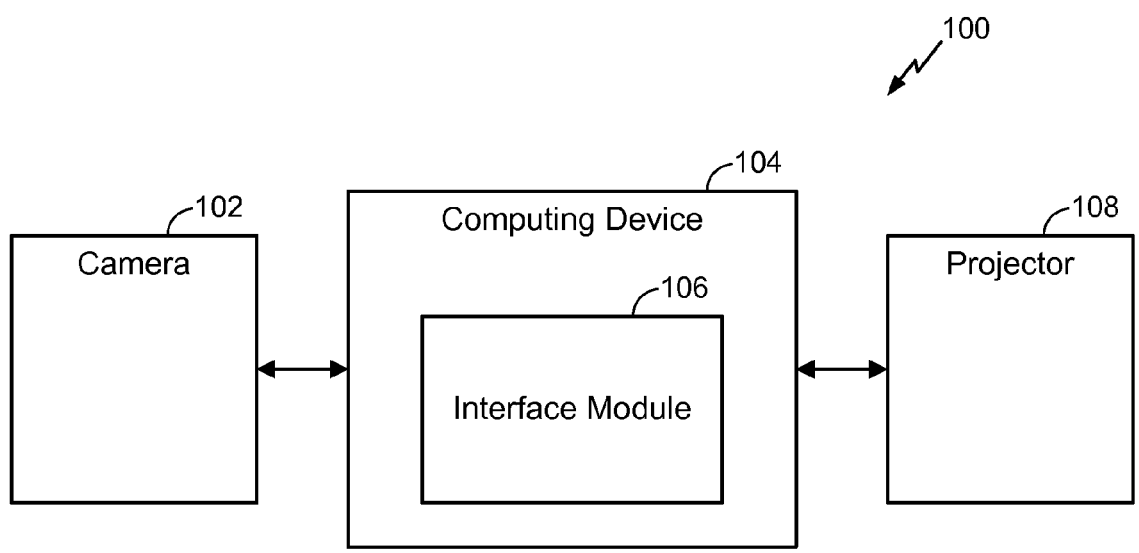
FIG. 1 is a block diagram illustrating one configuration of a computing device in which a computing device interface may be implemented.

As used herein, the term "wireless communication device" generally denotes an electronic device (e.g., access terminal, client device, client station, etc.) that may wirelessly communicate with a base station or other electronic device. A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards (e.g., $3^{rd}$ Generation Partnership Project (3GPP), Wi-Max, Institute of Electrical and Electronics Engineers (IEEE) 802.11 or Wi-Fi, etc.). Thus, the general term "wireless communication device" may include wireless communication devices described with varying nomenclatures according to industry standards (e.g., access terminal, user equipment (UE), remote terminal, etc.).

The systems and methods disclosed herein present a real-time hand tracking and/or gesture interface. This interface allows the combination of a computing device (e.g., an electronic device with processor and memory such as a smartphone, laptop, etc.), a camera (e.g., a camera that operates in the visual spectrum such as a Complementary Metal-Oxide-Semiconductor (CMOS) sensor or camera, Charge-Coupled Device (CCD) sensor or camera, web cam, etc.) and a projector (e.g., pico projector, standard projector, etc.) to use a surface (e.g., wall, screen, whiteboard, etc.) as an interactive surface. In one configuration, a computing device is calibrated, detects a hand, tracks the hand and recognizes gestures to provide this interface. Testing of the systems and methods disclosed herein have illustrated that they work well in a variety of challenging environments, such as when users are interacting with content that has many skin-like colors or large amounts of motion.

Projectors are widely used today by individuals to share visual content with several others. Projection systems typically use an input source (e.g., a laptop computer, etc.), and often require at least one individual to control the running application. In traditional applications, this individual often sits by the laptop to have access to the computer's mouse and keyboard in order to advance a presentation to the next or previous slide, highlight portions of the content, draw, zoom in and out of regions of interest, play or pause video clips, click on User Interface (UI) elements, etc.

Although being seated next to the computer is acceptable in many situations, there are times when the presenter would prefer to speak to his audience while facing all of them, standing next to the content being shared. Unfortunately, this might require the presenter to continuously walk between the screen and computer in order to control the running application.

It is therefore beneficial to develop systems and methods that allow a user to control a computing device while standing near or within the projected image. It would be further advantageous to allow audience members the opportunity to control the computing device from afar, in order to participate in higher levels of collaboration.

Some handheld remote controls exist that allow users to be un-tethered from the projector-computing device rig. However, low to moderately priced versions often have limited functionality and do not allow users to draw freely on the surface, highlight, copy, paste or interact with UI elements. Regardless of cost, such systems typically require every person in the room who wishes to be an active participant in the process to have their own device, which is something that may not always be possible.

Given that humans often use hand gestures in everyday life as means of communicating with one another and moving and shaping objects in the world around them, allowing participants to use their hands in order to remotely control the computing device may be beneficial. For example, a user who wishes to become an active participant in a session may use his hand to draw, highlight, zoom in on, copy, paste, and/or drag and drop projected content. In one configuration, the content being projected is from a smartphone with an embedded pico projector. For instance, some smartphones can be equipped with pico projector and a camera.

The systems and methods disclosed herein describe a hand gesture recognition system for use with a projector. For example, the systems and methods disclosed herein may use the camera that has become common on many of today's laptops and mobile phones. While these cameras may have been included for teleconferencing or for taking pictures, the onboard sensor (e.g., camera) may be used as an input device instead of a mouse or keyboard. For example, the systems and methods disclosed herein may provide opportunities for individuals to turn any wall into a highly collaborative workspace. This may be possible since many smartphones are not only equipped with cameras that could be used to track hands, but also pico projectors capable of projecting 15 lumens, which is enough to create a 4-foot diagonal image in a moderately lit room.

According to one configuration of the systems and methods disclosed herein, the entire contents of the projected area is placed within the field of view of the camera and a calibration stage (lasting 15 seconds, for example) is completed before the session begins.

This disclosure describes several traditional approaches in the field of hand gesture recognition as follows. Hand detection is an area of active research in computer vision, especially given its level of complexity. When compared to face detection, where many good solutions exist today, building a hand detection and tracking system that works well in all environments has been difficult for several reasons.

First, an open hand is roughly half the size of the human face with respect to a front-facing camera, making feature tracking more difficult at the same resolution. At Video Graphics Array (VGA) resolution, tracking a hand from 10 feet across the room provides roughly 20 pixels in width for use by the recognition system. This is about half the data available to face detection algorithms. Furthermore, unlike the face, hands have very few unique features, which are useful for good tracking. In a camera-projector scenario, in order for users at the screen to see the content they wish to interact with, and to be able to use their finger tip (instead of their finger nail) to interact with it, they must stand with their backs to the camera. This may require tracking the back of the hand, which (unlike the face) has very few unique features. Additionally, the manner by which a human hand moves freely through space may pose more challenges than face tracking, given that hands are attached to long limbs, whose multiple joints provide greater degrees of freedom than the neck.

Many hand gesture systems have been proposed for vision-based interactions with computing devices. In one gesture system, a real-time hand gesture system for mobility purposes was proposed. The main features used in that system are Kanade, Lucas and Tomasi (KLT) features, which are placed on "good-to-track" skin color spots from a detected area. KLT features are named after Kanade, Lucas and Tomasi, who found that a steep brightness gradient along at least two directions makes for a promising feature for tracking purposes. Experiments with those algorithms as implemented in Open Computer Vision's (OpenCV's) Application Programming Interface (API) functions (e.g., cvGoodFeaturesToTrack and cvCalcOpticalFlowPyrLK) did not yield good results for situations where the user's hand was more than a few feet from the camera.

Another more complex and computationally inefficient hand gestures recognition algorithm using pseudo two-dimensional Hidden Markov Models has been proposed. Such systems would not work well in the camera-projector scenario since tests on hue changes of human skin under various projected content showed a wide gamut. For example, skin under different projected light (which may be a wide color gamut) as seen by a camera may make skin-tone detection-based methods ineffective.

Yet another approach proposed a real-time hand gesture algorithm for a camera-projector system. During a calibration stage, perspective distortion was modeled by polynomial warping between the coordinates of the camera and projected screen. Detection and tracking were based on background segmentation. However, such an approach requires static backgrounds, which is something that is not guaranteed for the systems and methods disclosed herein.

One motivation in the design of the systems and methods disclosed herein was to design a system that could achieve real-time performance (e.g., less than 50 millisecond (ms) response time) on a modern day embedded processor found in today's mobile phones. Accordingly, another approach would not work due to the level of complexity. That approach included a requirement to read two VGA images (one being the projected image and the other being how the camera sees this image on the screen), crop, warp and color correct the image from the camera for proper registration to the actual image and then search for multiple hands in the silhouettes created by the difference image. That approach did not seem feasible for a requirement of under 50 ms for perceived real-time performance.

In order to avoid burdening the user, approaches that rely on time-of-flight (TOF) cameras, other types of systems that require cameras working under infrared (IR) light, stereo cameras, or those that require the user to wear a special glove or place colored caps on their fingers were not considered. In other words, the systems and methods disclosed herein do not require that the user wear a special glove or colored caps and do not require that a user mark his/her hand. Furthermore, the systems and methods disclosed herein do not require IR or TOF cameras, since these may tax a device's battery or consume a relatively large amount of energy. Additionally, the systems and methods disclosed herein do not require the use of multiple (e.g., stereo) cameras. One goal achieved by the systems and methods disclosed herein is accuracy in tracking and/or interaction. For example, the systems and methods disclosed herein provide sufficient resolution to interact with small buttons on a Graphical User Interface (GUI).

One example configuration of the systems and methods disclosed herein follows. In this configuration, four different stages are described: a two-step calibration stage that maps coordinates from the projected images to a computing device's display space and determines a hand size, a stage where hand detection is performed (which allows users to initiate a tracking process), a stage used to track the hand based on patterns (e.g., Haar features) and a gesture recognition stage. In the gesture recognition stage, for example, finger recognition is based on patterns (e.g., four patterns or Haar features) that have been mapped to the left button on the computing device's mouse. Live demos have shown that the systems and methods disclosed herein perform well for a variety of different content.

One factor in getting users engaged in any new activity is to provide a low learning curve to some aspect of the system whereby the user can instantly experience some sense of pleasure. When the user's emotions come down from this initial feeling of joy, they may then decide to spend more time learning the system, perhaps even becoming a power user.

In order for the systems and methods disclosed herein to have minimal training for new users and yet provide a high level of functionality, the systems and methods reflect the way that many users already use their computers: when seated behind their desks. In that setting, users may first reach for the computing device mouse, place their hand over it, move it to some location on the table that maps the cursor to a desired location on the display, and then press one of the mouse buttons to accomplish some desired task. The systems and methods disclosed herein function similarly in one configuration. For example, a user may walk up to a projected image or display, "pick up" a virtual mouse from some initial interaction area (e.g., an area designated as a virtual "mouse pad," with their index finger extended (as if over a left mouse button)), move their hand over the screen to the desired location while a cursor follows their hand, and then "click" or "click and hold and drag" or "release click" on User Interface (UI) elements.

For example, users may learn two intuitive gestures: a closed hand with an extended index finger to simulate a user resting his hand on a computer mouse with his index finger on the left mouse button, and the same gesture but with the index finger hidden to simulate a click or click-and-hold operation. Releasing the "mouse button" is accomplished by revealing the finger in order to return to a resting position. Thus, these gestures may be easy or intuitive to learn for many users.

The systems and methods disclosed herein may be accurate and perform in near real-time. For example, one goal for the systems and methods herein was to be able to locate a hand position in under 50 ms, and be accurate enough that a user could select UI elements on Microsoft Windows Vista's Start Menu in a typical projection setup (e.g., where the projected image is 90 inches wide by 65 inches tall). Another goal for the systems and methods herein was to use zero or minimal calibration. Furthermore, it was desirable for the systems and methods to not require the use of any more sophisticated equipment beyond a projector and laptop or phone with a VGA resolution camera, for example. Thus, the simplicity and ease of use of the systems and methods disclosed herein may encourage users to use them.

One configuration of the systems and methods disclosed herein includes calibration, hand detection, hand tracking and gesture recognition as described below. Calibration may be used for camera-projector pair configurations. The coordinates of the projected content captured from the camera's point of view, referred to as projected space, are mapped to the those on a computing device display, referred to as desktop space coordinates. For example, corners A, B, C and D in the projected space may be mapped to corners A', B', C' and D' in a desktop space. Although referred to as "desktop space coordinates," the mapping may or may not occupy the whole of a computing device display or "desktop." Images captured by the camera may suffer from location and scale differences relative to the desktop space coordinates and may suffer from perspective distortions because the objects are 2-Dimensional (2D) projections of a 3-Dimensional (3D) environment.

In order to generate a transformation matrix, one configuration of the systems and methods disclosed herein employs a one-time calibration. A known image for calibration is projected. For example, checkered or chessboard pattern may be projected into the projection space. The four corners of the checkered or chessboard image may be found (e.g., using OpenCV's cvFindChessboardCorners( ) function). These points may then be used to search for the actual coordinates of projected space. For the calibration process to complete successfully, the content being projected is entirely within the camera's field of view in one configuration.

The systems and methods disclosed herein may also determine a hand size for accurate tracking A predominant factor that determines the size of the hand as seen by the camera is how large an image the projector can create. The more powerful the projector, the further back it may be placed from the screen to create the largest image possible, which may also require the camera to be placed further away from the screen. In one configuration, an image with circles of different radii is projected. A user places his/her closed fist inside the circle that provides the tightest fit for a time (e.g., 2 seconds). Based on changes in intensity, the circle that the user selected may be identified.

The systems and methods disclosed herein may be used to detect a hand. For example, a user's hand is detected when placed in a marked area of the projected space, referred to as an initial interaction area or the virtual "mouse pad." This may initiate hand tracking. In one configuration, the virtual mouse pad is in the bottom right corner of the screen and is four times larger than the size of the hand that was determined during the calibration phase. While the computing device is running, it is continuously differencing incoming pixel values in this marked area from corresponding pixels in previous frames. When the sum of differences, as observed in the luma or luminosity channel, is above a fixed threshold, the hand-tracking phase is entered, which starts by ensuring that the change is in fact due to a hand.

The systems and methods disclosed herein may be used to track one or more hands. For example, the systems and methods disclosed herein may use the fact that human skin typically absorbs more light than materials found in surrounding areas, such as screens, painted walls, white boards, etc. Given this, several patterns (e.g., five new Haar features) may be used to look for an object that has reflectance properties similar to the back of the hand and wrist under projected light, relative to non-skin materials.

In one configuration, each of the patterns (e.g., five filters or Haar features) are applied to the data that covers an area four times larger than the measured hand size, at the last known hand location in the image. In this configuration, the search space is scanned from left to right, top to bottom, pixel by pixel. The pattern that has a maximum difference between the sum of light gray areas for a given filter and sum of corresponding dark gray areas is selected. The filter with the best fit is then checked against a set of thresholds (that are pre-determined or computed offline, for example). More specifically, the average pixel values (e.g., luma, intensity, etc.) in lighter areas or regions (e.g., three regions: "1", "2" and "3") are larger than those in a first darker area or region (e.g., "5") plus one threshold (e.g., 20 luma or intensity levels—more detail is given below). The average pixel values in a second darker area (e.g., "4") are checked to be less than the value in the first darker area (e.g., "5") minus one threshold (e.g., 20). Additionally, the average pixel value from the first darker or center area (e.g., "5") is checked to be larger than a value (e.g., 30 luma or intensity levels), which may help to avoid tracking the head or shadows of the hand. If none of the filters (e.g., five filters) were successful in finding a fist and wrist, the operation may be repeated until a hand is found.

The systems and methods disclosed herein may use "pixel values," "intensity" or "luma" values. In one configuration, for example, the camera may output 1 byte of data for each of red, green and blue components. This data may be converted into luma (Y or Y'), blue difference (Cb) and/or red difference components (Cr). The luma component may be referred to as a "pixel value" or "intensity." The luma component may be represented, for example, using an 8-bit (1 byte) number. Thus, the luma, pixel value or intensity may range in value or levels from 0 (with all bits being 0) for black to 255 (with all bits being 1) for white. A "threshold" may be defined as a certain intensity value or number of intensity levels. For example, a threshold may be defined as 20 or 30, etc.

For example, for real-time performance, integral images are computed for use by the Haar features (e.g., five Haar feature patterns). For three horizontal and vertical Haar feature patterns, integral images can be computed. For two filters at +45 and −45 degrees, integral images are computed via a rotated sum area table described. The search may be terminated once one of the five filters matches the criteria.

The systems and methods disclosed herein may be used for gesture recognition. For example, two different input actions may be supported: the press and release of a computing device's left mouse button. For instance, a closed fist with extended index finger may indicate when the mouse button is not depressed, while hiding the index figure maps to the button being pressed.

In one configuration, when a tracked hand has stopped moving for some interval (e.g., 700 milliseconds (ms)), the systems and methods begin a search for the presence of an index finger. Several (e.g., 4) Haar features may be used for this. In one configuration, the gesture recognition begins by first scaling the tracked hand image into an image of fixed size (e.g., 40×40 pixels for a webcam of 640×480 pixels). The scaling may depend on the object (e.g., finger) size sought and/or the resolution of the camera. It should be noted that the Haar features or filters may additionally or alternatively be scaled. Based on the (scaled) image, an integral image is computed for use when index finger is pointing in the horizontal or vertical direction. The criteria for the selected index finger is that the average pixel value for light areas (e.g., "1" and "3") should be larger than the value in a dark area (e.g., "2") plus one threshold (e.g., 30). If a finger in the horizontal or vertical pattern is found, the search is terminated. Otherwise, the rotated integral image is computed at +45 and −45 degrees. If no index finger is found using these filters, the hand is considered to be in a closed fist gesture.

In order to improve the robustness of the finger recognizer, for example, a maximum voting algorithm is applied to a buffer of 20 stored frames. For instance, the systems and methods may require that at least 80% of the images in the buffer depict a hidden index finger before a left mouse button event is triggered (to an operating system's (OS') window manager, for example). In order to detect a revealed index finger, 50% of the 20 frames searched must report the discovery of the index finger, for example. The lower threshold requirement for the reveal vs. hiding of the index figure is due to a state machine, which may require up-mouse events to be triggered only after a down-mouse event has been detected. This serves as a filter to reduce false positives.

The systems and methods herein may be implemented according to one example test implementation as follows. For example, in one implementation, the systems and methods were developed in C leveraging the OpenCV library. An HP Compaq 6710b laptop configured with Intel Core 2 Duo T7300 2 GHz processors with 2 GB RAM and running Windows XP was used. The webcam was a Creative Live! Cam Video IM Ultra capable of capturing VGA resolution images as 30 frames per second (fps). The projector was an Epson PowerLite 83+ projecting an image on a screen that measured 92 inches wide by 65 inches tall. The lighting in the room was lowered to 66 lux, where users could easily see the screen and one another comfortably. The light at the screen when projecting a gray image having a Red-Green-Blue (RGB) value of 128 was 72 lux. During the hand-tracking and gesture-recognition phases, the implementation was measured to consume only 23% of the Central Processing Unit (CPU). To measure the accuracy of the implementation, the number of times a user already familiar with the system could stand 10 feet away from the camera and use his bare hand to navigate to four pre-determined positions on the screen in order to trigger a down-mouse event followed by an up-mouse event were tabulated.

The content being projected was a video playing in full-screen mode. To ensure the videos were chosen at random, 50 of the most popular videos on YouTube in the "Videos Being Watched Now" category were selected at the time of the test. None of the videos were used during the development phase. To ensure the videos played throughout the test uninterrupted, only videos that were longer than 1 minute in length were selected and were fully buffered before the tests began and gestures were disabled from actually triggering mouse events, which would have paused the video.

In the test, four regions on the screen were labeled A, B, C, D and mapped to the upper left, upper right, lower right and lower left corner, respectively, of a rectangle that has ½ width and ½ height of the projected area centered at the bottom ⅓ of the screen. The test required the user to "pick up" the cursor or virtual mouse from the initial interaction area or virtual mouse pad, navigate the hand to position A and, if the cursor was successfully tracked to within 2 inches of that position, to click on the region. If that gesture was recognized correctly, the user would then release the virtual mouse button by revealing the index finger. Following this, the user would then move his/her hand to the right to position B, down to position C and finally left to position D, doing the two hand gestures at each of these three positions as well. In all, 12 measurements were made for each video.

The results of 4 tests are shown in Table 1 below for each of 50 videos. The results illustrate that the above implementation of the systems and methods disclosed herein was 96% effective in tracking the hand to each of the predetermined locations. Of the 192 times that the cursor tracked the hand successfully, it detected the click gesture 157 times, indicating 82% effectiveness. Of these 157 successful recognitions, this implementation detected the accompanying release gesture 154 times.

TABLE 1

| | All Positions | | |
|---|---|---|---|
| | Track | Click | Release |
| Attempts | 200 | 192 | 157 |
| Failed | 8 | 35 | 3 |
| Effectiveness | 96% | 82% | 98% |

The 82% effectiveness of the click gesture recognition reveals that there is room for improvement in finger detection. However, in an effort to choose gestures that would be easy for users to both remember and learn, the systems and methods disclosed herein track a finger that is approximately 6 pixels wide given the VGA camera is 10 feet from the screen. In other configurations, the click gesture may be mapped to an action that is more visible from these distances, possibly an open to closed fist action, for example. Optionally, the hand tracker could be used to drive the gesture engine. For example, after the hand has stopped for a period of time, the cursor may be fixed to its current position while the user moves his/her hand left and right three times to denote a click action. Moving the hand right to left three times would denote a click and hold action, followed by right to left three more times for release of the button, for example. In short, there is often an inverse relationship between the quality of a gesture system and the intuitiveness of the gesture set. The simpler the gesture for the user, often the more complex it is to support.

Possible actions according to the systems and methods disclosed herein include drawing, zooming into a picture (which may even be rich in skin-like colors) or pausing and playing a YouTube video, etc. As discussed above, the systems and methods disclosed herein provide real-time and robust hand-gesture systems and methods that allow the combination of a computing device with a pico or standard projector to turn any wall or screen into a "touch-capable" surface (e.g., a surface where users can interact with the computing device through gestures relative to a projected image). One configuration of the systems and methods disclosed herein comprises four stages: calibration, hand detection, hand tracking and gesture recognition. The systems and methods may allow users to use their bare hands to control, for example, a single-button "mouse" of the computing device running the projected application from 10 feet across the room. After conducting 200 tests of one implementation, the implementation proved to be 96% effective in tracking the users hand, 82% effective in detecting the gesture assigned to the left mouse click and a 98% success rate of detecting the left mouse button being released. That implementation offers a real-time experience and only consumes 23% of the CPU on a modern day laptop.

Other configurations of the systems and methods disclosed herein may include additional functionality or features. In one configuration, the systems and methods may include a function for "releasing" the cursor or leaving the cursor in a current location. For example, a gesture may be used to allow a user to take his/her hand off the virtual mouse (i.e., where the system stops tracking the hand and leaves the cursor at its current position). For instance, gesture recognition may be used such that when a user opens his/her hand (e.g., extends all five fingers), the systems and methods may leave the cursor at its current location and/or discontinue hand tracking.

In one configuration, a bright "glow" effect to the position of a hand (e.g., the last determined hand position) may be added to further improve the robustness of the hand tracker and gesture engine. By actually modifying the content that is projected just around the hand, interference with performance from high-contrast imagery may be reduced or eliminated. For example, a projected image may be modified such that an area around the last tracked or determined location of the user's hand is lightened or brightened. For instance, a white circle may be placed in the projected image around the last determined hand location (thereby "masking" part of the projected image, for example). This may improve the ability of the systems and methods herein to determine the current hand location (assuming, for example, that the hand isn't moving too fast).

In one configuration, the systems and methods may allow the initial interaction area or virtual mouse pad to track the user's body or hips such that he/she does not need to walk to the mouse pad each time. For example, a (lower) portion of the screen may be scanned to find a contiguous light region next to a contiguous dark region next to another contiguous light region. The dark region may indicate the location of the user's body, hips or torso, for example. This location may be used to move the initial interaction area to be next to the user. For instance, an estimated hand size and/or face size (e.g., based on calibration/facial recognition) may be used to estimate the size of a user's body (e.g., hips, torso, etc.). In one configuration, a multiple of this estimated hand size may be used. For instance, the user's body may be estimated as five times the width of the user's hand. Thus, one or more Haar patterns or filters may be determined based on the estimated body size. For example, a light left region may be 2-3 times the hand size, a dark (central) region may be 4-6 times the hand size and/or a light right region maybe 2-3 times the hand size. In one configuration, this body tracking may be performed only when hand tracking is not being performed, for example.

The systems and methods may also use face detection to estimate hand size. For example, facial detection may be used to estimate or determine a face size, which may then be used to estimate a fist size (which may be used to estimate a body size, etc.). For instance, a fist size may be estimated as ⅕th to ¼th of a user's face size. The systems and methods herein may support tracking of multiple hands (of a single or multiple users, for example). For example, several virtual mouse pads (that may be overlapping and/or in some pattern) may be provided to allow tracking of multiple hands.

The systems and methods disclosed herein may support gestures beyond a left mouse click and support an ability to extend the cursor away from the user's hand in order to reach far corners of the screen. This can be achieved by computing the angle between a user's thumb and index finger, for example. For instance, several Haar patterns or features could be used that allow matches at a variety of different angles, such as 0, 15, 30, 45, 60, 75 and 90 degrees, for example. With a match of the 90 degree pattern, the cursor may be extended to a maximum distance (e.g., 15 feet) away from the user's hand down to a minimum distance with a 0 degree pattern match. The location of the hand may be used to determine an area (relative to the hand, for example) to search for the thumb.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration 100 of a computing device 104 in which a computing device interface may be implemented. Examples of the computing device 104 include desktop computers, laptop computers, smartphones, cellular phones, Personal Digital Assistants (PDAs), e-readers, an integrated circuit including a processor and memory, gaming consoles, etc. The computing device 104 communicates with and/or is connected to a camera 102 and/or a projector 108. In one configuration, the computing device 104 generates images to be projected by the projector 108. The computing device 104 receives captured images or image data from the camera 102. The camera 102, computing device 104 and/or projector 108 may be integrated into one device (e.g., a smart phone with a camera and pico projector) or may be separate devices (e.g., a web cam, laptop computer and standard projector).

The computing device 104 includes an interface module 106. The interface module 106 may be implemented as hardware, software or a combination of both. The interface module 106 enables hand tracking and gesture recognition for images captured by the camera 102. For example, the interface module 106 calibrates the computing device 104, detects one or more hands, tracks one or more hands and recognizes gestures (e.g., based on images captured by the camera 102). The hand tracking and/or gesture recognition may be used by the interface module 106 to perform an operation or trigger a command. In other words, the computing device 104 may perform an operation and/or trigger a command based on hand tracking and/or gesture recognition. In this way, the interface module 106 enables a hand tracking and gesture recognition interface. For example, the computing device 104 may generate an image that is projected by the projector 108 onto a wall, screen or surface. The interface module allows a user to interact with the computing device 104 by moving his/her hand to a location on (or in front of) the projected image and/or gesturing. The images of the hand movement and/or gesture captured by the camera 102 may be used by the interface module 106 to determine a hand location and/or whether a gesture was performed. This can be used to perform an action or operation, such as "clicking" on an icon shown in the projected image, zooming in or out, drawing, selecting, copying, pasting, dragging, etc.

Figure 2:
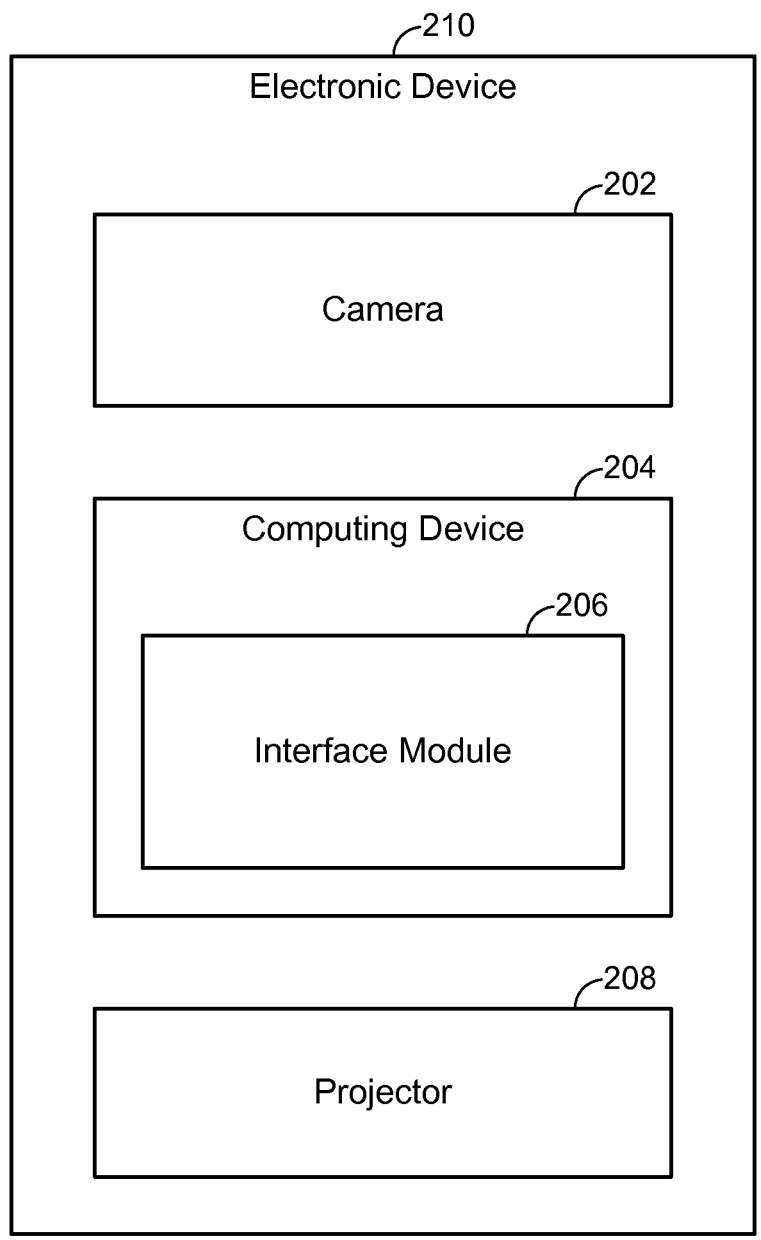
FIG. 2 is a block diagram illustrating one configuration of an electronic device including a camera, computing device and projector.

FIG. 2 is a block diagram illustrating one configuration of an electronic device 210 including a camera 202, computing device 204 and projector 208. In one configuration, for example, the camera 202, computing device 204 and projector 208 are integrated into one electronic device 210. For example, the electronic device 210 may be a wireless communication device, such as a cellular phone, smartphone, laptop computer, etc. The wireless communication device may include an integrated digital camera 202, an integrated pico projector 208 and a computing device (e.g., integrated processor and memory) 204. Examples of other electronic devices 210 include a desktop computer (with integrated camera 202 and projector 208) and a tablet device (with integrated camera 202 and projector 208).

The computing device 204 may include an interface module 206. For example, the interface module 206 may be implemented as software with instructions in memory that are executed by the processor. In another configuration, the interface module 106 may be implemented directly in hardware. The electronic device 210 may be configured to perform the methods disclosed herein.

Figure 3:
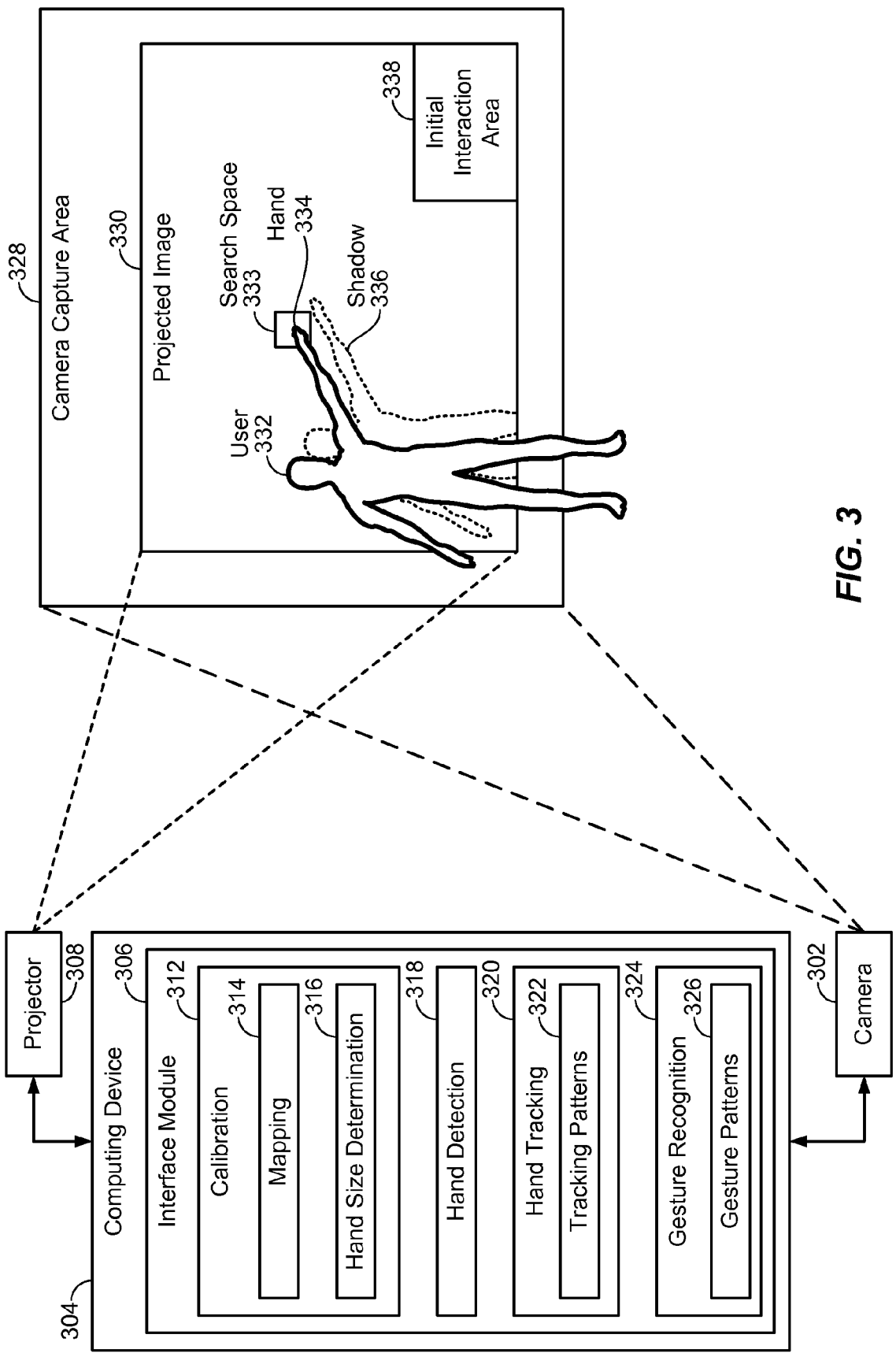
FIG. 3 is a block diagram illustrating a more specific configuration of a computing device in which a computing device interface may be implemented.

FIG. 3 is a block diagram illustrating a more specific configuration of a computing device 304 in which a computing device interface may be implemented. The computing device 304 may communicate with a projector 308 and camera 302. As discussed above, the projector 308, computing device 304 and/or camera 302 may be separate devices or may be integrated into one or more devices.

The computing device 304 may generate and/or send image data to the projector 308. The projector 308 may generate a projected image 330 using the image data. The camera 302 captures an image or image data in a camera capture area 328 that includes the projected image 330. The camera 302 may also capture full or partial images or image data of a user 332.

The computing device 304 includes an interface module 306. In the configuration illustrated in FIG. 3, the interface module 306 includes a calibration module 312, a hand detection module 318, a hand tracking module 320 and a gesture recognition module 324. The calibration module 312 includes a mapping module 314 and a hand size determination module 316.

The mapping module 314 is used to map coordinates from the projected image 330 or projected space into a "desktop space." For example, the desktop space may include all or part of a visually interactive space or Graphical User Interface (GUI) on the computing device 304, such as a "desktop" or "window" generated by the computing device 304. In one configuration, the projected image 330 is an image of the desktop space. For example, the desktop space may include icons, buttons, interactive controls (e.g., sliders, dials, radio buttons, text boxes, etc.), visual displays of one or more applications, images, videos, etc. These desktop space elements may be projected as the projected image 330.

The mapping module 314 may map locations from the projected image 330 as captured by the camera 302 to locations in the desktop space. In order to accomplish this mapping, the computing device 304 may use the projector 308 to project a projected image 330 that can be used by the mapping module 314 to determine a mapping. For example, the projected image 330 may be a checkered or chessboard pattern that the mapping module 314 may use to find or determine the corners of the projected image 330 or projected space (from the image captured by the camera 302, for example). Those corners may then be mapped to the corners of the desktop space.

The hand size determination module 316 is used to determine the size (or estimate of the size) of the user's 332 hand 334. For example, the computing device 304 uses the projector 308 to a project an image that includes a series of circles or ellipses. The hand size determination module 316 may determine which circle the user's hand 334 is in. For instance, the user 332 places his/her hand 334 in the circle or ellipse that mostly closely matches his/her hand 334 size. The computing device 304 (e.g., hand size determination module 316) detects a change in intensity for that particular circle or ellipse. The hand size determination module 316 may then determine that the size of the circle or ellipse (e.g., in pixels) is the hand 334 size of the user 332. The determined hand 334 size may be used to determine the size of search space 333, for example.

The hand detection module 318 is a module that can be used to detect when a user's hand 334 is being used to interact with the computing device 304. For example, the hand detection module 318 may monitor an initial interaction area 338 in the projected image (or projected space). In one configuration, the initial interaction area 338 is four times larger than the hand 334 size determined by the hand size determination module 316 and resides in the lower right portion of the projected image 330 or projected space. Multiple initial interaction areas 338 may be used to accommodate multiple hands and/or multiple users 332. For example, multiple initial interaction areas 338 may overlap, be placed in a particular pattern (e.g., checkerboard) and/or may move (with one or more users 332, for example).

In one configuration, the initial interaction area 338 may be a different size, may be placed in a different location of the projected image 330 or the projected space and/or may move (e.g., the user's 332 body or torso may be tracked and the initial interaction area may move with the user 332, to be next to the user 332, for example). In one configuration, for instance, the computing device 304 may move the initial interaction area 338 based on the user's 332 body location. The computing device 304 may accomplish this by searching for a dark area or pattern corresponding to the user's 332 body (e.g., hips, backside, torso, back, etc.). The computing device 304 may search only a portion of the projected image for this dark area or pattern (e.g., the bottom $\frac{1}{10}^{th}$ of the projected image, etc.). The width of the user's 332 body may be estimated as a multiple of hand 334 size (e.g., five times the fist size of the user 332). The computing device 304 may use this tracked location of the user's 332 body to move the initial interaction area 338 such that it is next to the user 332 (e.g., by the user's 332 waist, etc.). Thus, the user 332 will not have to move to the lower-right corner of the projected image every time he/she desires to "pick up" the "virtual mouse" or cursor.

In order to track a user's 332 body, one or more Haar patterns or filters may be used. For example, one pattern may comprise a rectangular left light region next to a rectangular central dark region next to a rectangular right light region. This pattern may be used to search the image data for a match in the image data indicating a body location. The size of the regions may be determined or estimated based on a calibration or based on a determined or estimated hand 334 size. For example, the computing device may determine or estimate a hand size through calibration using one or more circles or ellipses or through facial recognition. The left and/or right light regions' size (e.g., width) may be a multiple of two to three hand sizes (e.g., widths), while the central dark region's size (e.g., width) may be three to five hand sizes (e.g., widths). The location of a pattern match in the image data may be used to move the initial interaction area.

Only a lower portion of the projected image 330, such as the lower tenth, may be searched for the user's 332 body. In one configuration, the user's 332 body may be searched for when a hand 334 is not being tracked. In one configuration, the initial interaction area 338 may remain stationary while no match in the image data to a pattern is found. Additionally or alternatively, one or more additional patterns or filters may be used (that may be similar to the foregoing example, though one or more regions may be different in size, for example) in order to track the user's 332 body when the user's 322 side is facing the camera 302.

The hand detection module 318 may monitor the initial interaction area 338 for a user hand 334. In one configuration, the hand detection module 318 computes differences between the luma (e.g., intensity) or luminosity of pixels in the current frame and that of corresponding pixels in one or more previous frames in the initial interaction area 338. These differences may be summed. If the sum of the differences (e.g., of the luma or luminosity channel) is above a threshold, this may indicate that a hand 334 is in the initial interaction area 338. When this occurs, the hand detection module 318 may indicate that the hand tracking module 320 should start tracking a hand 334. The hand tracking module 320 may check or verify the change (in luma or luminosity, for example) to ensure that the change is in fact due to a hand 334.

The hand tracking module 320 is used to track a user's hand 334. The hand tracking module 320 may include one or more tracking patterns 322. Examples of the tracking patterns 322 include Haar feature patterns. The tracking patterns 322, for example, may include two dark regions. One of the dark regions may be a central dark region (e.g., representing the back of the user's hand 334) surrounded by three lighter regions. The other dark region may be adjacent to the central dark region (e.g., representing the user's 332 wrist).

When the computing device 304 is tracking a hand 334 (which may have been initiated by the hand detection module 318), the hand tracking module 320 may scan a particular search space 333 of the image or image data provided by the camera 302. In one configuration, the search space 333 is about four times the size of the hand 334 size determined by the hand size determination module 316. The computing device 304 (e.g., hand tracking module 320) may scan the search space 333 for a best fit to one of the tracking patterns 322. If no match is found, the hand tracking module 320 may continue to search for a hand 334 (and/or may eventually terminate searching for a hand 334 if one is not found over a period of time, for example). If a match is found, the computing device 304 (e.g., hand tracking module 320) may use the location and/or position of the match. In one configuration, the search space 333 may change (e.g., grow, shrink) dynamically based on the motion (e.g., speed and direction) of the hand 334. For example, if the tracked hand 334 is moving quickly in a particular direction, the computing device 304 may increase the area of the search space, particularly in the direction of motion. In one configuration, the area of the search space 333 may also decrease, particularly if a user's hand 334 is moving slowly. It should also be noted that the search space 333 may be any size, up to and including the size of the camera capture area 328. However, a reduced search space 333 (e.g., four times the size of the user's 332 fist) may be used and be more computationally efficient.

The filter or tracking pattern 322 with the best fit may be checked against a set of thresholds. This check may help avoid tracking the user's head 332 or the shadows 336 of the hand 334. Once the filter or tracking pattern 322 with the best fit is checked (and passes the check), the location and/or position of the match may be used. For example, the location of the match may be used to control the location of a cursor on the computing device 304. In other words, the computing device 304 may move its cursor to the location in the desktop space indicated by the match.

The gesture recognition module 324 may use gesture patterns 326 to detect a gesture. For example, the gesture patterns 326 may be Haar features used to detect a particular gesture, such as extending or retracting one or more fingers or placing the fingers in a particular position. For instance, the gesture patterns 326 may include three rectangular regions (stacked side-by-side, for example). The two outside regions may be lighter regions and the inner region may be a darker region. The group of rectangular regions may be vertical, horizontal and/or at angles (e.g., ±45°). In one configuration, the computing device 304 (e.g., gesture recognition module 324) detects when a tracked hand 334 has stopped moving for some interval of time (e.g., 700 ms). When this occurs, the gesture recognition module 324 scales the tracked hand 334 image into a fixed size (e.g., 40×40). For example, an area based on the last tracked location of the hand 334 may be used to determine an image area to be searched. Based on this image, an integral image is computed for used when an index finger is pointing in a horizontal or vertical direction. If a finger in the horizontal or vertical pattern 326 is found, the search is terminated. Otherwise, a rotated integral image at +45° and −45° is computed. If a rotated finger is found, the search may also terminate. However, if no finger is found, then the computing device 304 (e.g., gesture recognition module 324) may determine that the hand 334 is closed (without an extended finger).

In one configuration, the computing device 304 may perform an operation and/or trigger an event if a particular gesture is recognized. For example, if the gesture recognition module 324 determines that no finger is found, then the computing device 304 may trigger a left mouse down or clicked event. Furthermore, if a finger is found, then the computing device 304 may trigger a mouse up event. Thus, a mouse click may be simulated. In another configuration, the gesture recognition module 324 may use a "voting" operation or function. For example, the gesture recognition module 324 may buffer or store 20 frames. The gesture recognition module 324 may require 80% of the buffered frames to indicate a hidden finger before the left mouse event is triggered. Furthermore, the gesture recognition module 324 may require that 50% of the 20 frames indicate an extended finger before triggering a mouse up event. Furthermore, the computing device 304 may employ a state machine that will only allow mouse up events following a mouse down event. This may serve as a filter to reduce false positives.

Additional configurations may employ alternative and/or additional features. In one configuration, the computing device 304 may generate a brighter area or "glow" around the tracked hand 334 to improve tracking. For example, the computing device 304 may increase the brightness of a number of pixels around the location of the tracked hand 334 in an image to be projected. As mentioned above, multiple hands may be concurrently tracked and/or multiple gestures may be concurrently recognized in some configurations.

In one configuration, the computing device 304 may remove dark portions (e.g., luma<~35) of the captured image before performing tracking and/or gesture recognition to avoid detecting, tracking and/or recognizing gestures from shadows 336 of the user's hand 334 and/or fingers. For example, the computing device 304 may determine pixels from the captured image that are very dark (e.g., below a particular threshold) and remove those pixels from consideration in the pattern search.

In one configuration, the computing device 304 (e.g., gesture recognition module 324) may recognize a gesture based on an angle between a thumb and index finger of the user's hand 334. For example, the computing device 304 may move a cursor away from the user's hand 334 based on the angle between the user's 332 index finger and thumb. This may allow a user to control a cursor in unreachable areas of the projected image, depending on the configuration. For instance, the computing device 304 may interpret a fully extended thumb (e.g., approximately 90° between thumb and index finger) as a command to move the cursor away from the user's hand 334 by a particular distance (e.g., a number of pixels, a percentage of the distance between the user's hand 334 and the edge of the projected image, a number of hand 334 sizes, etc.). This distance may be based on the size of the angle between the index finger and thumb. For example, as the user 332 reduces the angle between index finger and thumb, the distance may be reduced until the cursor is at the user's hand 334 with no angle between the index finger and thumb. In one configuration, the direction may be based on a detected wrist location (such that the cursor extends directly away from the hand 334, for example). In another configuration, the angle between index finger and thumb may be used for some other operation, such as a zoom-in/zoom-out operation, for example.

In one configuration, the camera 302 provides improved focus, exposure and/or color reproduction in the area of the projected image 330. For example, the computing device 304 may command the camera 302 to focus on the projected image 330 and/or improve its exposure and/or color reproduction for the projected image 330. This may come at the expense of the remainder of the camera capture area 328. For example, part or all of the remainder of the camera capture area 328 besides the projected image 330 area may be out of focus or have a poor exposure and/or color reproduction. Additionally or alternatively, enhanced focus, exposure and/or color reproduction may be used on another region of interest, such as the search space 333 or initial interaction area 338, for example.

In one configuration, the projector 308, camera 302 and user 332 are all on the same side of the surface (e.g., wall, screen, whiteboard, etc.) used for the projected image 330. In another configuration, the projector 308 may be behind the surface used for the projected image 330. It should be noted that the systems and methods herein may apply to a user's hand 334 in any position. For example, the back, front or side of the user's hand 334 may be tracked. The user's hand 334 may additionally or alternatively have one or more fingers extended and/or hidden at different times.

Figure 4:
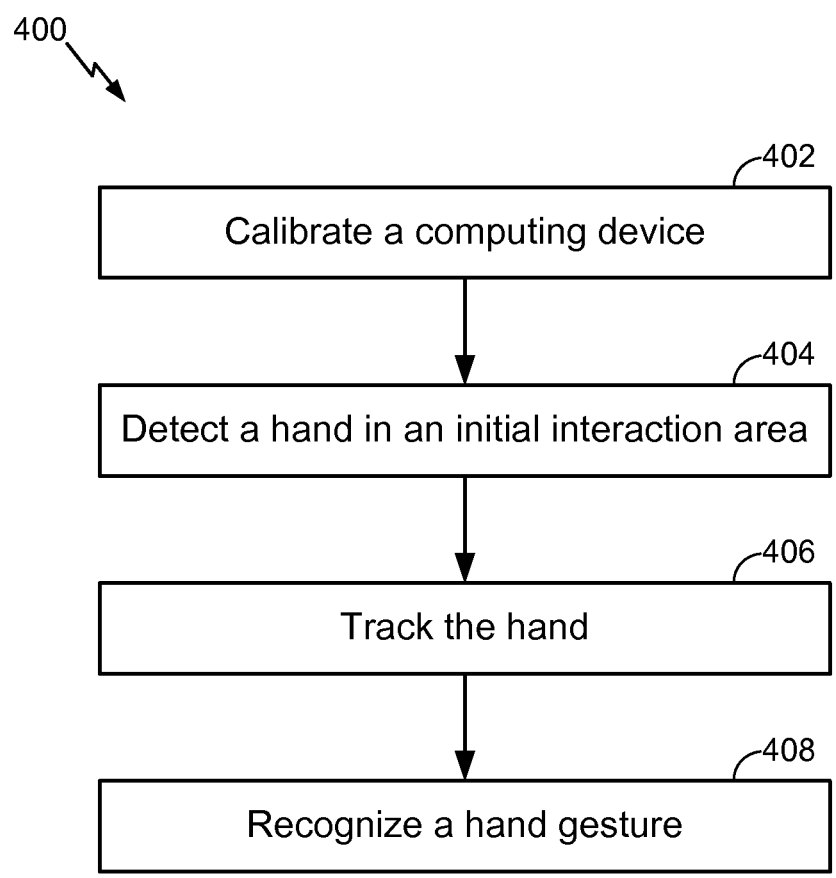
FIG. 4 is a flow diagram illustrating one configuration of a method for providing a computing device interface.

FIG. 4 is a flow diagram illustrating one configuration of a method 400 for providing a computing device interface. The computing device 104 may be calibrated 402. In other words, the computing device 104 may calibrate 402 itself 104. For example, the computing device 104 may find the corners of an image projected by the projector 108 or projected space (captured by a camera 102). It 104 may use these corners to map the projected space to a desktop space. For instance, coordinates in the projected space may be mapped to coordinates in the desktop space (by way of a transformation matrix, for example). The computing device 104 may also determine the size of a hand 334 by detecting the presence of a hand 334 in a circle or ellipse on a projected image.

The computing device 104 may detect 404 a hand 334 in an initial interaction area. For example, the computing device 104 may detect a change in luma or luminosity in an area of the captured image (e.g., a lower right corner or by a user's 332 torso, etc.).

The computing device 104 may track 406 the hand 334. For example, the computing device 104 may use tracking patterns (e.g., Haar features) to determine the location and/or position of a hand 334. For instance, the computing device 104 may select the tracking pattern with the greatest difference between the sum of light gray areas and the sum of dark gray areas for a given filter. The filter with the best fit may be checked against a set of thresholds. If the check passes, the computing device 104 may use the location and/or position of the tracked hand 334.

The computing device 104 may recognize 408 a hand 334 gesture. For example, the computing device 104 may detect the movement of one or more fingers or the hand 334 that may be interpreted as a gesture. In one configuration, the computing device 104 uses gesture patterns to search for one or more fingers. The computing device 104 may interpret the presence, absence or a sequence of movements of one or more fingers as a gesture. When a gesture is detected, it may be used to trigger an event or operation. For example, the computing device 104 may interpret the absence of any fingers as a mouse-down event, while the presence of a finger (after a mouse down event) may be interpreted as a mouse-up event.

In another configuration, the computing device 104 may interpret a particular motion of the hand 334 (or fingers) as a gesture. For example, the computing device 104 may interpret three fist shakes as a particular gesture that could trigger an event or operation. For example, the computing device 104 may buffer one or more frames and match the movement of the fist and/or one or more fingers to a particular pattern that indicates a gesture. Buffered frames may additionally or alternatively be used to increase the robustness of gesture recognition. For example, the computing device 104 may require that a certain percentage of buffered frames indicate a particular detection (e.g., finger extended, finger hidden, etc.) before triggering an event or operation.

Figure 5:
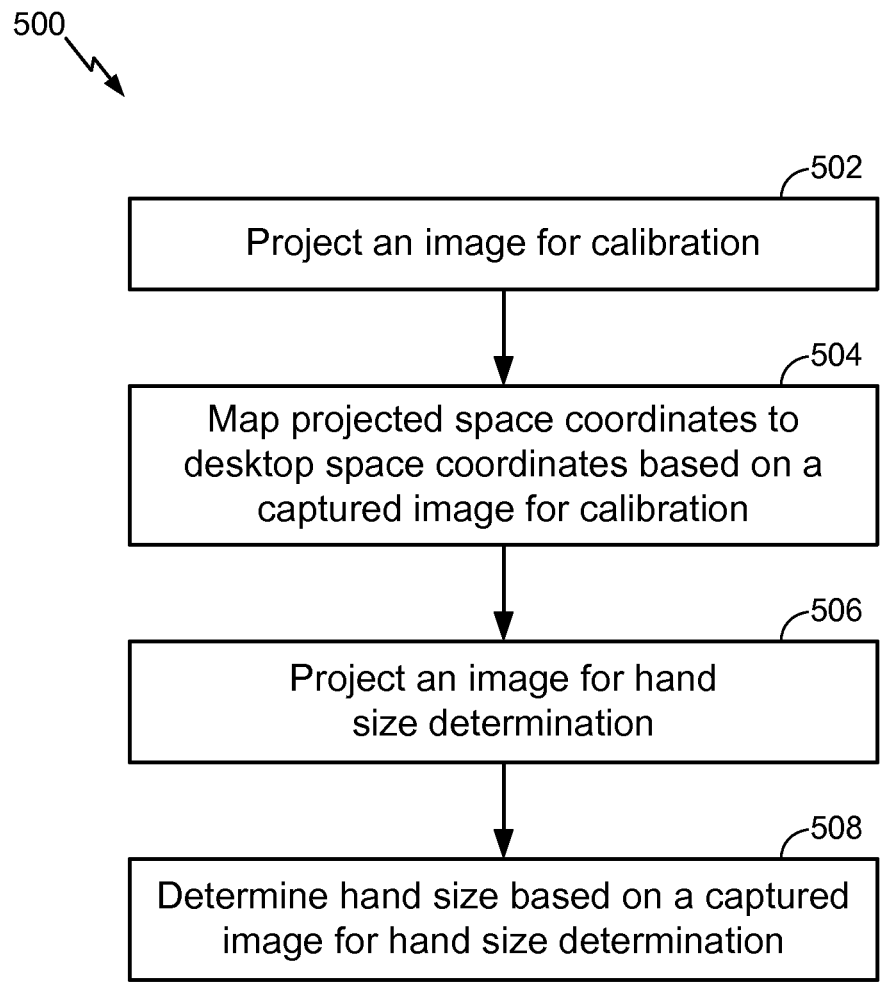
FIG. 5 is a flow diagram illustrating a more specific configuration of a method for providing a computing device interface.

FIG. 5 is a flow diagram illustrating a more specific configuration of a method 500 for providing a computing device interface. More specifically, method 500 illustrated in FIG. 5 gives more detail on calibrating 402 a computing device 104. A computing device 104 may project 502 an image for calibration using a projector 108. For example, the computing device 104 may generate and project (using the projector 108) a checkered or chessboard image or some other image that may be used to determine the corners of the projected image as captured by a camera 102. The computing device 104 may map 504 projected space coordinates to desktop space coordinates based on a captured image for calibration. For example, the computing device 104 may find the corners of the projected image by searching for one or more drops in luma or luminosity (e.g., at the edges). The computing device 104 may map 504 the corners of the projected image as captured by the camera 102 to the corners of a desktop space on the computing device 104. For instance, the computing device 104 may generate a transformation matrix based on the location of the corners of the projected image or projected space.

The computing device 104 may project 506 an image for hand 334 size determination. For example, the computing device 104 may use a projector 108 to project an image that includes a series of circles or ellipses. The computing device 104 may determine 508 a hand 334 size based on a capture image for hand 334 size determination. For example, the computing device 104 may use one or more images or image frames captured by a camera 102 to determine a projected circle or ellipse that a user's hand 334 is placed in. For instance, the computing device 104 may use pixel intensity values from the current frame and compare them to corresponding pixel intensity values from one or more previous frames. The computing device 104 may detect a change in pixel intensity values that indicates that a user has placed his/her hand 334 in a particular circle. For example, when pixel intensity values corresponding to a particular circle or ellipse are reduced from a previous to a current frame, the computing device 104 may determine that the particular circle or ellipse with reduced intensity is the size of a user's hand 334 or fist.

Additionally or alternatively, the computing device 104 may estimate the size of a user's hand 334 by performing facial recognition. In one configuration, the computing device 104 may use the size of the user's 332 head (determined through facial recognition) to estimate the size of the user's hand 334. For example, the computing device 104 may estimate the size of a user's hand 334 as $\frac{1}{3}^{rd}$ the size of the user's 332 head. In another configuration, the computing device 104 may perform the hand 334 size determination using a circle or ellipse and also store calibration data based on the user's 332 face (using facial recognition). For example, the computing device 104 may perform a hand 334 size determination/calibration for user A and store determination/calibration data associated with the user 332 in conjunction with data that can be used to recognize user A (via facial recognition). In this way, the next time user A uses the interface, the computing device 104 may automatically calibrate itself for the hand 334 size associated with the recognized user A's face.

Figure 6:
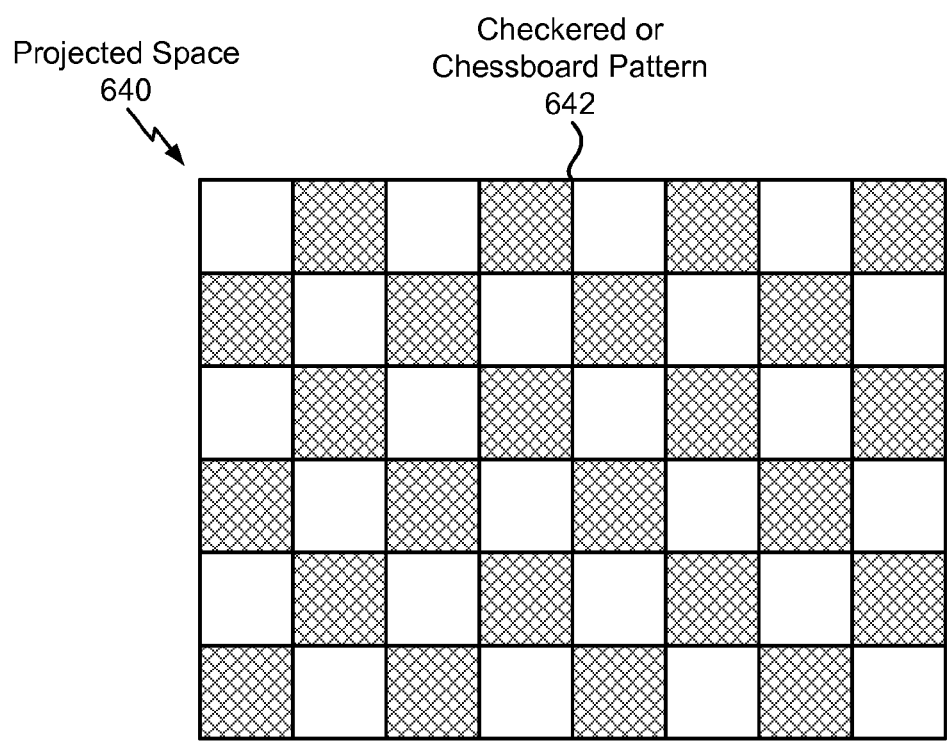
FIG. 6 is a diagram illustrating one configuration of a checkered or chessboard pattern in a projected space.

FIG. 6 is a diagram illustrating one configuration of a checkered or chessboard pattern 642 in a projected space 640. The computing device 104 may generate and project (using the projector 108) an image of a checkered or chessboard pattern 642 in projected space 640. A camera 102 may capture an image of the checkered or chessboard pattern 642 and send the image or image data to the computing device 104. The computing device 104 may use the image or image data to determine the corners of the projected space 640. For example, the computing device 104 may search the checkered or chessboard pattern 642 for one or more drops in luma or luminosity at the edges (e.g., top, bottom, left side, right side, etc.) in order to determine the corners. The corners of the projected space 640 (as captured by the camera 102) may be used to determine a transformation matrix. The corners of the projected space 640 may be used to search the actual coordinates of the projected space 640.

Figure 7:
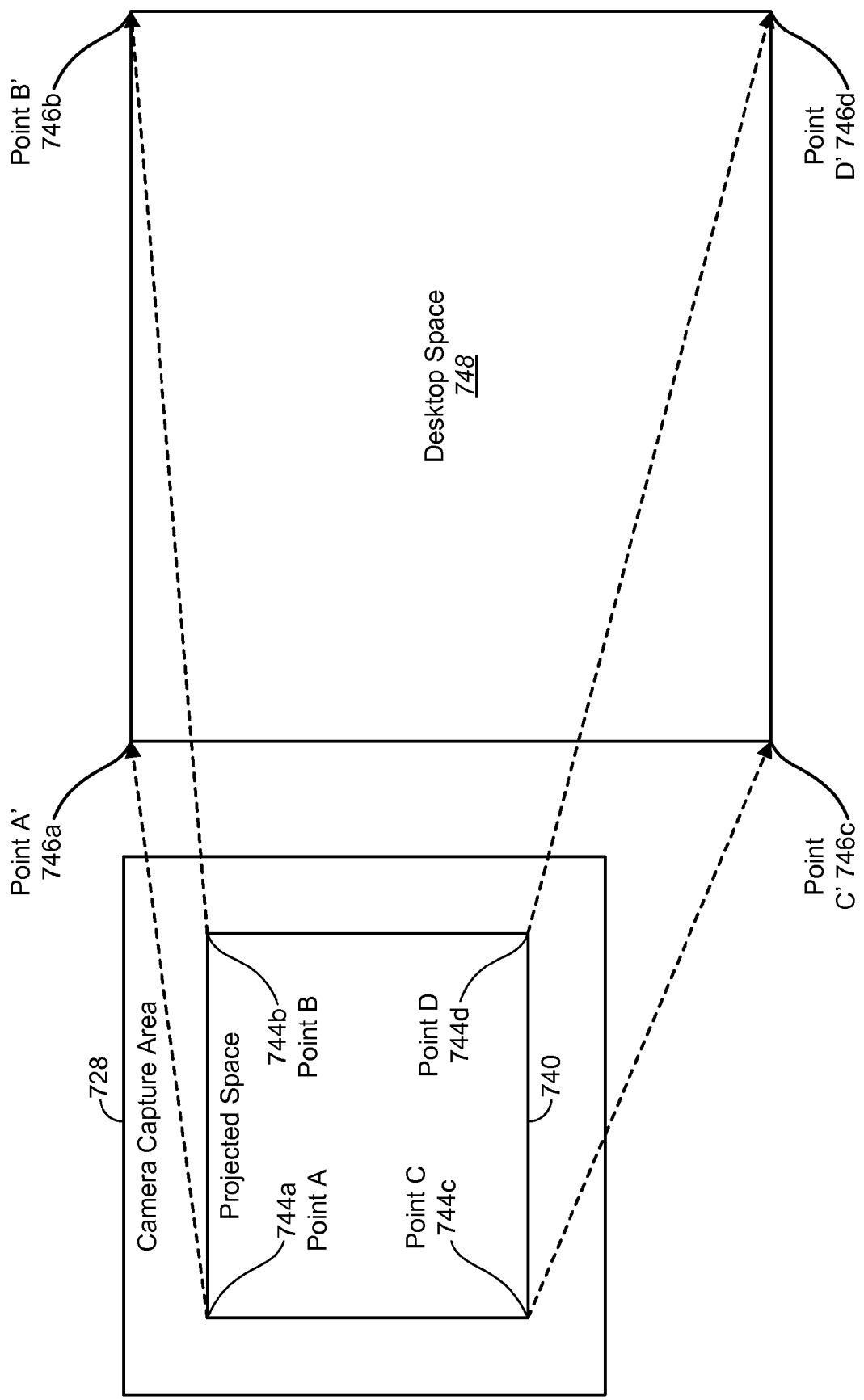
FIG. 7 is a diagram illustrating the mapping of a projected space into a desktop space.

FIG. 7 is a diagram illustrating the mapping of a projected space 740 into a desktop space 748. A computing device 104 generates and projects an image (using the projector 108) into projected space 740. A camera 102 captures the projected image. The camera 102, however, may capture an image in a camera capture area 728, which may be larger than the projected space 740. For example, the coordinates of the projected content captured from the camera's capture area 728 (or point of view), referred to as projected space 740, may be mapped to those on the computing device's 104 display or to those in a region on the computing device's 104 display, referred to as desktop space 748 coordinates. For instance, point A 744*a*, point B 744*b*, point C 744*c* and point D 744*d* (e.g., corners) are respectively mapped to point A' 746*a*, point B' 746*b*, point C' 746*c* and point D' 746*d*. Images captured by the camera 102 may suffer both from location and scale differences relative to the desktop space 748 coordinates and from perspective distortions because the objects are 2D projections of a 3D environment.

Figure 8:
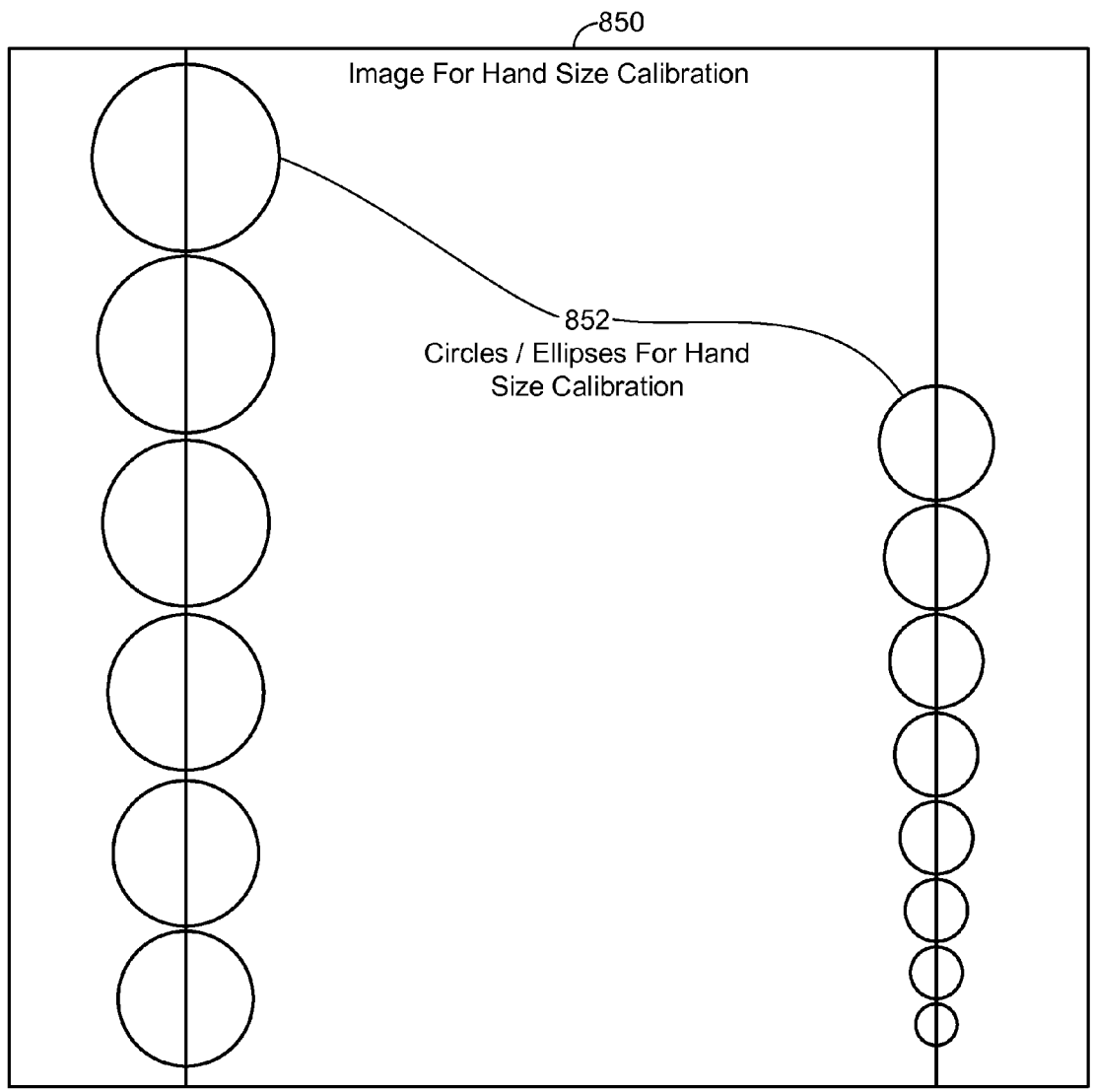
FIG. 8 is a diagram illustrating an image for hand size calibration.

FIG. 8 is a diagram illustrating an image 850 for hand 334 size calibration. For example, the computing device 104 may generate an image 850 for hand 334 (e.g., fist) size calibration and may project it 850 using a projector 108. In one configuration, the image 850 for hand 334 size calibration includes circles or ellipses 852 for hand 334 size calibration. The camera 102 captures one or more images (e.g., frames of image data) of the image 850 for hand 334 size calibration. The computing device 104 then detects a change in intensity (e.g., pixel intensity) in one (or more, for example) of the circles or ellipses 852. For example, the computing device 104 compares the intensity of pixels corresponding to the circles or ellipses from one or more previous frames to pixels in a current frame. When a change is detected, the computing device 104 selects the circle or ellipse 852 corresponding to the change in intensity. In one configuration, the computing device 104 may select a circle or ellipse 852 only after the change is detected for a number of frames (e.g., when the change is consistent for a period of time such as 2 seconds). This may help to avoid choosing a circle or ellipse 852 when a user 332 walks in front of them, for example. The selected circle or ellipse 852 may indicate a hand 334 (e.g., fist) size (in number of pixels, for example).

Figure 9:
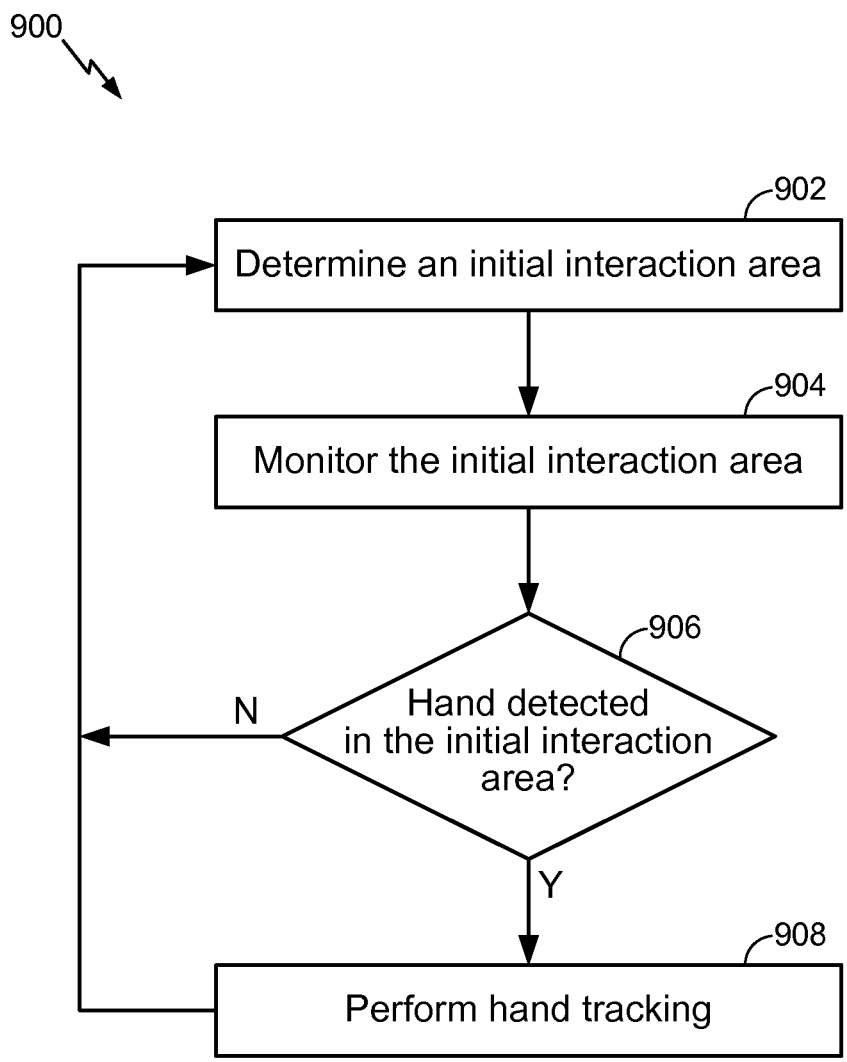
FIG. 9 is a flow diagram illustrating another more specific configuration of a method for providing a computing device interface.

FIG. 9 is a flow diagram illustrating another more specific configuration of a method 900 for providing a computing device interface. More specifically, the method 900 illustrated in FIG. 9 gives more detail on detecting 404 a hand 334 in an initial interaction area (to transition to hand tracking, for example). A computing device 104 may determine 902 an initial interaction area. In one configuration, the initial interaction area is set in the lower right corner of the projected image, with a size of approximately four times the hand 334 size (determined during calibration, for example). In other configurations, the initial interaction area may be placed or set in another predetermined area, such as the lower left portion of the projected image, the lower middle portion of the projected image, or some other area. In another configuration, the computing device 104 may move the initial interaction area. For example, the computing device 104 may track the position of a user 332 (e.g., the user's 332 torso or a darkest 1/n width based on calibration, etc.) and place the initial interaction area next to the user 332. In this way, the initial interaction area moves when the user 332 moves. Thus, the computing device 104 may determine 902 an initial interaction area.

The computing device 104 may monitor 904 the initial interaction area. For example, the computing device 104 may monitor 904 the luma or luminosity values of the pixels in the initial interaction area using images or image data captured by the camera 102. In one configuration, the computing device 104 stores or buffers one or more frames of image data (e.g., pixels) corresponding to the initial interaction area.

The computing device 104 may determine 906 whether a hand 334 is detected in the initial interaction area. In one configuration, the computing device 104 computes differences between luma or luminosity values of pixels in the initial interaction area in one or more previous frames and corresponding values of pixels in a current frame. In this configuration, the computing device 104 computes the sum of these differences, which is compared to a threshold. If the sum of the differences is less than the threshold, the computing device 104 determines 906 that no hand 334 is detected in the initial interaction area. In that case, operation may return to determining 902 an initial interaction area. If the sum of differences is greater than the threshold, the computing device 104 determines 906 that a hand 334 is detected in the initial interaction area and transitions to perform 908 hand tracking. It should be noted that this determination 906 may be preliminary. For example, once the computing device 104 determines 906 that a hand 334 has been detected in the initial interaction area, one or more operations may be performed in performing 908 hand tracking to ensure (e.g., verify or check) that the change in luma or luminosity is due to the presence of a hand 334.

Figure 10:
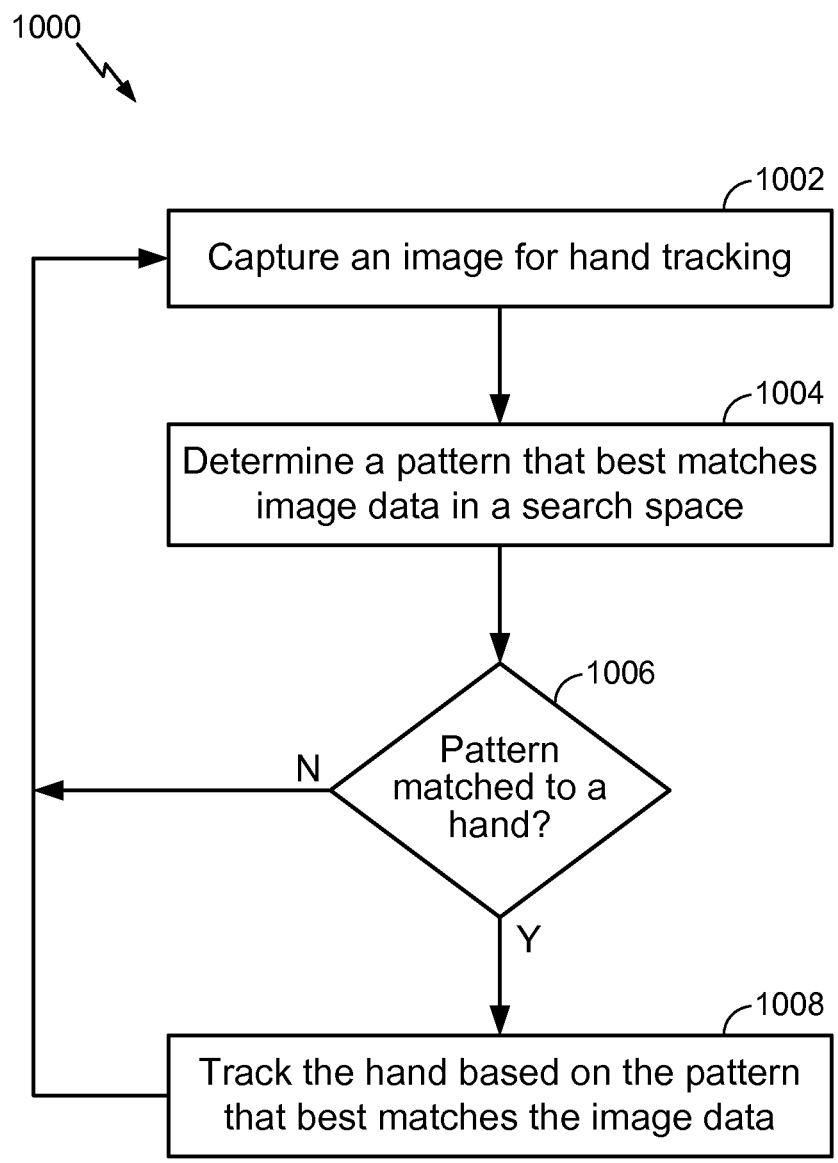
FIG. 10 is a flow diagram illustrating another more specific configuration of a method for providing a computing device interface.

FIG. 10 is a flow diagram illustrating another more specific configuration of a method 1000 for providing a computing device interface. A computing device 104 may capture 1002 an image for hand 334 tracking using a camera 102. For example, the camera 102 may capture one or more images or image data, which is/are provided to the computing device 104. The computing device 104 may receive, store (e.g., buffer) and/or use these images or image data.

The computing device 104 may determine 1004 a pattern that best matches image data in the search space. In other words, the computing device 104 may determine 1004 a pattern (e.g., tracking pattern) with a best fit in a search space. For example, several Haar feature patterns may be used. In one configuration, five Haar patterns are used, each comprising five rectangular areas or regions. A central "dark" rectangular region is surrounded by or shares borders with four outer rectangular areas or regions (and represents a user's 332 fist, for example). Of the four outer regions, three are lighter regions and one is a dark region. For example, one of the patterns includes the dark outer region to the left of the center dark region. The other patterns may have the dark region below the center dark region and to the right of the center dark region. Two other patterns may have the dark outer region to the lower left and to the lower right of the center dark region. These two patterns may be, for example, rotations by ±45° of the pattern with the dark outer region directly below the center dark region. Examples of these patterns are given in FIGS. 11A-11E.

The computing device 104 may use the patterns to determine 1004 a pattern that best matches (e.g., best fits) image data in a search space. For example, tracking the user's hand 334 may be accomplished by searching for one or more dark regions surrounded by one or more brighter regions (since skin tends to absorb more light than the projecting surface, for example) in a search space or area (of image data) that is larger than the user's hand 334. In one configuration, the search space is approximately four times the size of the determined hand 334 size and is located (e.g., centered) at the last (determined) location of the user's hand 334. The computing device 104 scans image data in the search space pixel by pixel from left to right and top to bottom. The computing device 104 then selects the pattern (e.g., filter or feature) that best matches, having the greatest or maximum difference (in luma, pixel value or intensity, for example) between the sum of lighter (e.g., light gray) areas and the sum of dark (e.g., dark gray) areas for a given filter. The pattern with the greatest or maximum difference is selected as the best match or best fit in the search space image data. The best matching pattern has a location and/or orientation corresponding to the image data in the search space that may be used to perform an operation, such as track the hand 334.

More specifically, for example, one or more patterns may be used to find a match in the image data. For instance, a match may be determined when the average pixel value (e.g., luma, intensity, etc.) of the image data corresponding to the dark region of the pattern that are a threshold darker (e.g., 20 luma levels lower) than the average pixel values of the image data corresponding to other lighter regions (e.g., three light regions). The average pixel value may be the sum of pixel values divided by the number of pixels in a region, for example. The pixels used to determine a match may correspond to the current location of the filter or pattern in the image data.

The computing device 104 may determine 1006 whether the pattern is matched to a hand 334. For example, one or more checks may be performed to verify that the determined pattern (with its location and orientation, for example) matches a hand 334 and not a shadow of the user's hand 334 or the user's 332 head, for example. In other words, the computing device 104 may check the pattern with the best fit. For example, the pattern or the image data with the best fit may be checked against a set of thresholds (e.g., pre-determined thresholds). In one configuration, the computing device 104 checks to verify that the average pixel values (in luma or intensity, for example) in the lighter outer regions (e.g., light gray regions) are larger than the average pixel value in the central dark area plus one threshold (e.g., 20). The computing device 104 may also check to verify that the average pixel value in the dark (e.g., dark gray) outer area is less than the average pixel value in the central dark (e.g., dark gray) area minus one threshold (e.g., 20). These foregoing checks may help to ensure that the pattern with the best fit corresponds to a user's hand 334. Additionally, the computing device 104 may check to verify that the average pixel value from the center dark area is greater than a value (e.g., 30), which may help to avoid tracking a user's 332 head or shadows of the user's hand 334.

For example, the computing device determines whether all of the checks previously mentioned are satisfied (in order to determine 1006 whether the pattern is matched to a hand 334). For instance, the computing device determines 1006 whether the average pixel values in lighter outer regions are greater than the average pixel value from the dark area plus a threshold, whether the average pixel value in the dark outer area is less than the average pixel value in the central dark area minus a threshold and whether the average pixel value in the center dark area is greater than a pre-determined value. If the computing device 104 determines 1006 that the pattern is not matched to a hand 334, then operation may return to capturing 1002 an image for hand 334 tracking. In other words, if the best matching pattern or image data (e.g., with the best fit) does not pass the checks (e.g., if none of the filters were successful in finding a fist and wrist), operation may return to capture 1002 an image for hand 334 tracking (e.g., the operations 1002, 1004, 1006 are repeated until a hand 334 is found and/or until the operations time out).

If the computing device 104 determines 1006 that the pattern is matched to a hand 334, the computing device 104 may track 1008 the hand 334 based on the pattern that best matches the image data. For example, the computing device 104 may move a cursor to the location of the matched pattern. More generally, if the pattern with the best fit passes the checks, the computing device 104 may perform an operation (e.g., track 1008 the hand) based on the pattern with the best fit. For example, the computing device 104 may move a cursor in its desktop space to the corresponding location of the pattern with the best fit. Examples of other operations that may be performed based on the pattern with the best fit include moving an image in the desktop space (e.g., translating or "dragging" a picture, icon, document view, etc.), using a control (e.g., sliding a slider control, turning a dial control, etc.), performing a game action (e.g., throwing a virtual ball, swinging a punch at a virtual boxing opponent, etc.) and others. The position of the best fitting pattern may also be used. For example, if the best fitting pattern indicates that the user's 332 wrist is horizontal, diagonal or vertical compared to the location of the user's hand 334, the computing device 104 may respectively turn a virtual dial to a corresponding horizontal, diagonal or vertical position. Furthermore, a series of best fit locations may be used. For example, the computing device 104 may track 1008 hand 334 movement over several frames. If the hand 334 movement matches a particular path or motion (e.g., three shakes), the computing device 104 may perform an operation or trigger an event, etc. More specifically, tracking a hand 334 may be used to trigger an operation or event in addition to or alternatively from gesture recognition. Many other additional and/or alternative operations may be performed based on the pattern with the best fit.

FIG. 11A illustrates one example of a Haar pattern 1100a (e.g., tracking pattern) that may be used according to the systems and methods disclosed herein. In this example, the Haar pattern 1100a comprises five rectangular areas or regions 1154a, 1154b, 1154c, 1156d, 1156e. More specifically, the Haar pattern 1100a comprises central dark area E 1156e. Central dark area E 1156e may represent a user's hand 334 or fist, for example. Outer light areas A 1154a, B 1154b and C 1154c adjoin central dark area E 1156e (e.g., above, to the right and below central dark area E 1156e, respectively). Outer dark area D 1156d adjoins dark area E 1156e (e.g., to the left). Outer dark area D 1156d may represent a user's 332 wrist, for example.

FIG. 11B illustrates another example of a Haar pattern 1100b (e.g., tracking pattern) that may be used according to the systems and methods disclosed herein. In this example, the Haar pattern 1100b comprises five rectangular areas or regions 1103a, 1103b, 1103c, 1105d, 1105e. More specifically, the Haar pattern 1100b comprises central dark area E 1105e. Central dark area E 1105e may represent a user's hand 334 or fist, for example. Outer light areas A 1103a, B 1103b and C 1103c adjoin central dark area E 1105e (e.g., above left, above right and below right of central dark area E 1105e, respectively). Outer dark area D 1105d adjoins dark area E 1105e (e.g., below left). Outer dark area D 1105d may represent a user's 332 wrist, for example. As may be observed, the Haar pattern 1100b illustrated in FIG. 11B may be an example of a −45° rotation of the Haar pattern 1100c illustrated in FIG. 11C.

FIG. 11C illustrates another example of a Haar pattern 1100c (e.g., tracking pattern) that may be used according to the systems and methods disclosed herein. In this example, the Haar pattern 1100c comprises five rectangular areas or regions 1107a, 1107b, 1107c, 1109d, 1109e. More specifically, the Haar pattern 1100c comprises central dark area E 1109e. Central dark area E 1109e may represent a user's hand 334 or fist, for example. Outer light areas A 1107a, B 1107b and C 1107c adjoin central dark area E 1109e (e.g., to the left, above and to the right of central dark area E 1109e, respectively). Outer dark area D 1109d adjoins dark area E 1109e (e.g., below). Outer dark area D 1109d may represent a user's 332 wrist, for example.

FIG. 11D illustrates another example of a Haar pattern 1100d (e.g., tracking pattern) that may be used according to the systems and methods disclosed herein. In this example, the Haar pattern 1100d comprises five rectangular areas or regions 1111a, 1111b, 1111c, 1113d, 1113e. More specifically, the Haar pattern 1100d comprises central dark area E 1113e. Central dark area E 1113e may represent a user's hand 334 or fist, for example. Outer light areas A 1111a, B 1111b and C 1111c adjoin central dark area E 1113e (e.g., below left, above left and above right of central dark area E 1113e, respectively). Outer dark area D 1113d adjoins dark area E 1113e (e.g., below right). Outer dark area D 1113d may represent a user's 332 wrist, for example. As may be observed, the Haar pattern 1100d illustrated in FIG. 11D may be an example of a +45° rotation of the Haar pattern 1100c illustrated in FIG. 11C.

FIG. 11E illustrates another example of a Haar pattern 1100e (e.g., tracking pattern) that may be used according to the systems and methods disclosed herein. In this example, the Haar pattern 1100e comprises five rectangular areas or regions 1115a, 1115b, 1115c, 1117d, 1117e. More specifically, the Haar pattern 1100e comprises central dark area E 1117e. Central dark area E 1117e may represent a user's hand 334 or fist, for example. Outer light areas A 1115a, B 1115b and C 1115c adjoin central dark area E 1117e (e.g., below, to the left, and above of central dark area E 1117e, respectively). Outer dark area D 1117d adjoins dark area E 1117e (e.g., to the right). Outer dark area D 1117d may represent a user's 332 wrist, for example. The Haar patterns 1100a-e illustrated in FIGS. 11A-11E may be a set of Haar patterns used according to the systems and methods disclosed herein (as described above in connection with FIG. 10, for example).

Figure 12:
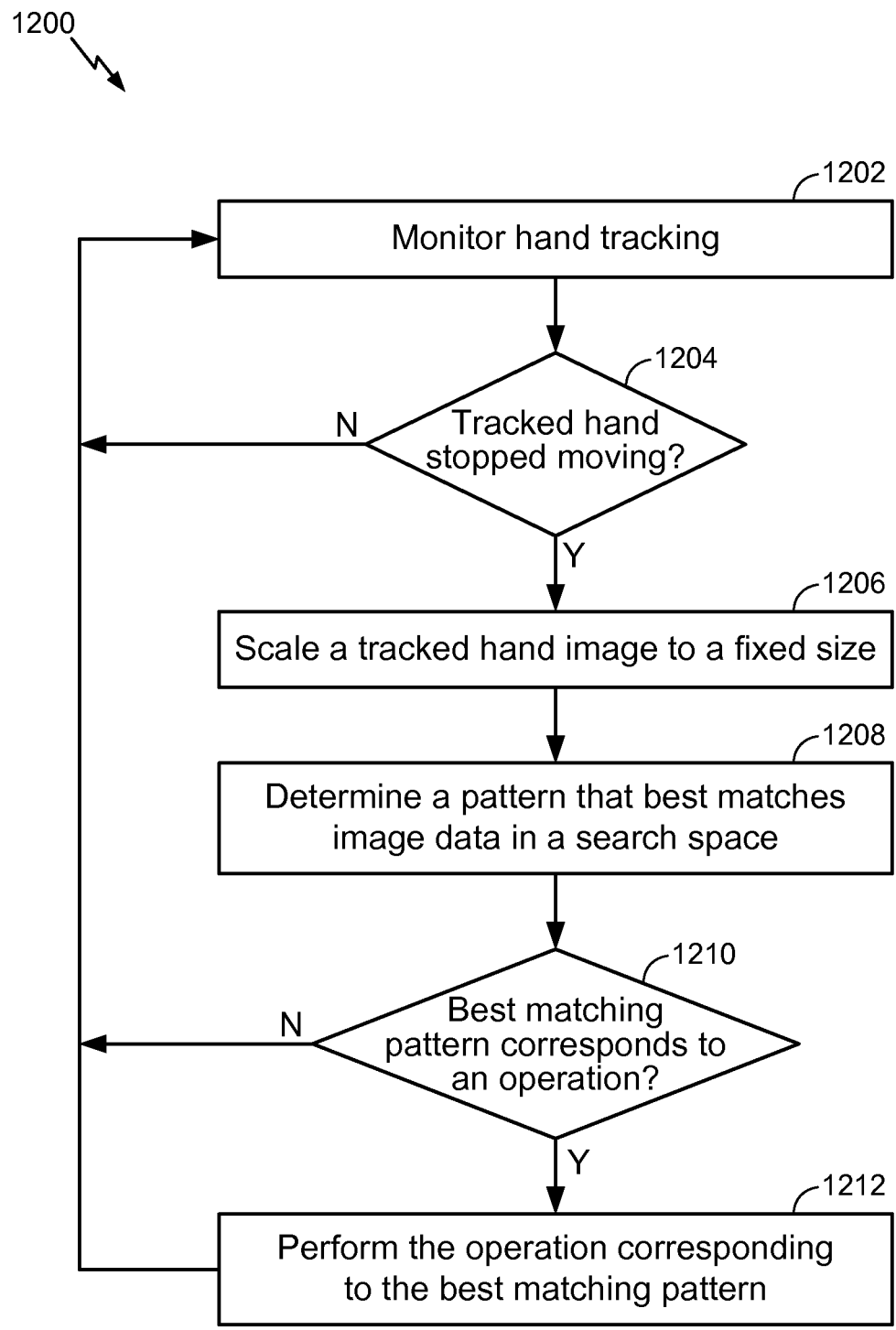
FIG. 12 is a flow diagram illustrating another more specific configuration of a method for providing a computing device interface.

FIG. 12 is a flow diagram illustrating another more specific configuration of a method 1200 for providing a computing device interface. More specifically, FIG. 12 illustrates more detail for recognizing 408 a hand 334 gesture. A computing device 104 may monitor 1202 hand tracking. In one configuration, the computing device 104 may monitor whether a tracked hand 334 is still moving or has stopped moving (for a number of frames, for example). The computing device 104 may determine 1204 whether the tracked hand 334 has stopped moving. For example, the computing device 104 may determine 1204 if the tracked hand 334 has stayed stationary or approximately stationary (within some range) for a number of frames or an amount of time. If the computing device 104 determines that the tracked hand 334 has not stopped moving (e.g., has continued to move), operation may continue or return to monitoring 1202 hand 334 tracking.

If the computing device 104 determines 1204 that the tracked hand 334 has not moved (e.g., has remained stationary for an amount of time (e.g., 700 ms) or a number of frames), the computing device 104 may scale 1206 a tracked hand 334 image to a fixed size. For example, the computing device 104 may scale 1206 the image or image data (captured using the camera 102) to particular dimensions (e.g., 40×40 pixels). Alternatively, the computing device 104 may scale the size of the filter or pattern. This may create a 1-to-1 mapping of the image to the filters, which may allow the image to be aligned to the template or pattern that is being searched for. For instance, the image may be scaled down to provide a better correspondence between a large finger size and the patterns or may be scaled up to provide a better correspondence between a small finger size and the patterns.

The computing device 104 may determine 1208 a pattern (e.g., gesture pattern) that best matches image data (or best fits image data, for example) in a search space (e.g., the scaled image). For example, the computing device 104 may use a set of four Haar patterns to determine 1208 a pattern that best matches image data in the scaled image. For example, the computing device 104 may search for a user's 332 finger by searching for a finger pattern (e.g., light and dark) in relation to the user's 332 detected hand 334 (e.g., relative to the detected center of a user's hand 334 or fist) when the user's hand 334 is stationary. For instance, each pattern may comprise three rectangular regions or areas. A dark (e.g., dark gray) area or rectangle may be between two lighter (e.g., light gray) areas or rectangles. In other words, two lighter areas may adjoin the dark area on opposite sides of the dark area. One of the patterns may be vertically aligned, another pattern may be horizontally aligned and the remaining two patterns may be aligned at ±45° degree diagonals, for example.

In one configuration, the computing device 104 may use the scaled image or image data to compute an integral image (e.g., a summed area table) for use when a finger (e.g., index finger) is pointing in a horizontal or vertical direction. For example, the criterion for a selected (index) finger is that the average pixel value for the outer lighter areas should be larger than the average pixel value in the dark area plus one threshold (e.g., 30). If a finger in the horizontal or vertical pattern is found, the search may be terminated. Otherwise, the computing device 104 may compute a rotated integral image at +45 and −45 degrees. If no finger is found using the filters, the computing device 104 may determine 1208 that the hand 334 is closed (e.g., in a closed fist gesture). That is, it should be noted that determining 1208 a pattern that best matches image data in a search space may include determining that no pattern in the set of patterns matches the image data (e.g., no finger was found).

In order to improve the robustness of gesture recognition, a "voting" approach may be used. When recognizing a finger, for example, a number of frames (e.g., 20) may be buffered or stored. The computing device 104 may require that a minimum percentage (e.g., 80%) of the images in the buffer depict a hidden index finger before determining that the finger is hidden. Furthermore, the computing device 104 may require that another minimum percentage (e.g., 50%) of the frames searched must report the discovery of an index finger before determining that the index finger is extended. The lower threshold requirement for the extended versus hidden index figure may be used since a state machine that requires up mouse events to be triggered only after a down mouse event has been detected may be used. The state machine may serve as a filter to reduce false positives.

The computing device 104 may determine 1210 whether the best matching pattern (which may be no pattern in the set of patterns, for example) corresponds to an operation. For example, the computing device 104 may interpret certain patterns or lack thereof as gestures to perform an operation. For instance, if no finger is found, the computing device 104 may interpret the lack of a finger pattern to a "mouse down" or depression of a left mouse button event or operation. Furthermore, the computing device 104 may interpret a detected extended finger as a "mouse-up" or release of a left mouse button event or operation. The lack or presence of many other hand 334 gestures may be used. For example, one or more fingers being held in a particular position (e.g., a particular angle between index finger and thumb) may be correspond to an event or operation. If the computing device 104 determines 1210 that the best matching pattern (which may be no matching pattern, as detected) does not correspond to an operation, then the computing device 104 may return to monitor 1202 hand 334 tracking. It should be noted that this determination 1210 may be made using a state machine. For example, only certain gestures (e.g., patterns or lack thereof) may be validly interpreted as corresponding to an event or operation when in a particular state. For example, the presence of a detected index finger does not indicate a "mouse-up" event unless the computing device 104 is in a "mouse-down" state. It should be noted that a "mouse-down" event followed by a "mouse-up" event may comprise a "click" (for interacting with a computing device 104 user interface (UI), for example).

If the computing device 104 determines 1210 that a best matching pattern (which may be no pattern in the set of patterns) corresponds to an operation, the computing device 104 may perform 1212 the operation corresponding to the best matching pattern (which may be no pattern in the set of patterns, for example). For example, the computing device 104 may perform 1212 the operation corresponding to a recognized hand 334 gesture. In one configuration, for example, the computing device 104 may use the lack of a best fit pattern indicating an extended finger (e.g., the absence of a detected finger) to trigger a "mouse down" or left mouse button depression event to an Operating System's (OS') window manager. Following the performance 1212 of the corresponding operation, the computing device 104 may return to monitor 1202 hand tracking.

According to the systems and methods disclosed herein, additional or alternative patterns and/or gestures may be used to trigger the performance 1212 of an operation. For example, a gesture may be used to "release" the cursor. For instance, one or more Haar patterns corresponding to an open hand 334 (e.g., with fingers extended) may be used. If the computing device 104 determines 1208 a best matching pattern to be an open hand 334 and determines 1210 that the open hand pattern corresponds to a cursor release operation, the computing device 104 may perform 1212 the operation by leaving the cursor at its current position. In one configuration, the cursor may be left at its current position until the computing device 104 detects a hand 334 in an initial interaction area 338, for example.

Figure 13:
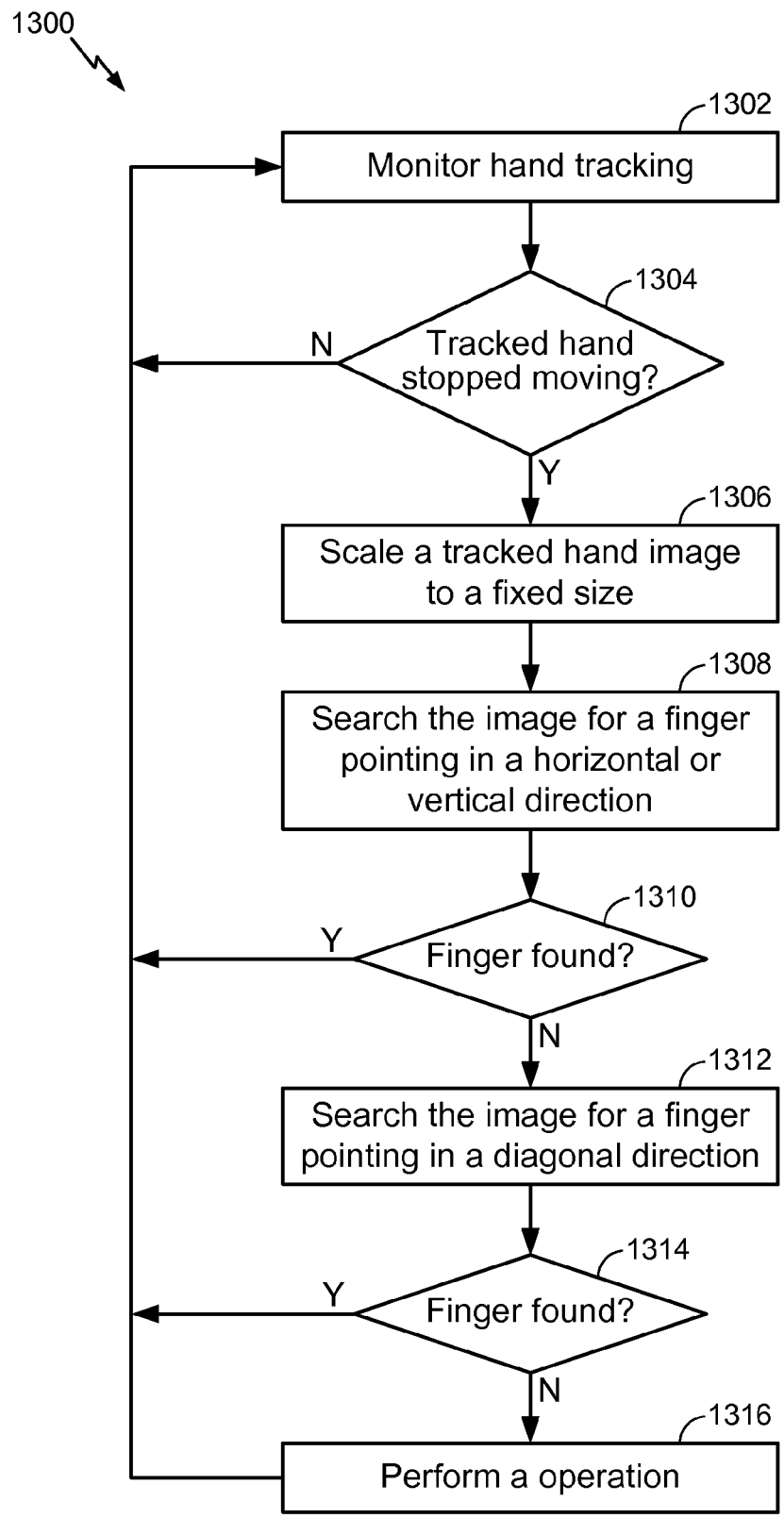
FIG. 13 is a flow diagram illustrating another more specific configuration of a method for providing a computing device interface.

FIG. 13 is a flow diagram illustrating another more specific configuration of a method 1300 for providing a computing device interface. More specifically, FIG. 13 illustrates more detail for recognizing 408 a hand 334 gesture, where the gesture involves the use of a finger. A computing device 104 may monitor 1302 hand tracking In one configuration, the computing device 104 may monitor whether a tracked hand 334 is still moving or has stopped moving (for a number of frames, for example). The computing device 104 may determine 1304 whether the tracked hand 334 has stopped moving. For example, the computing device 104 may determine 1304 if the tracked hand 334 has stayed stationary or approximately stationary (within some range) for a number of frames or an amount of time. If the computing device 104 determines that the tracked hand 334 has not stopped moving (e.g., has continued to move), operation may continue or return to monitoring 1302 hand 334 tracking.

If the computing device 104 determines 1304 that the tracked hand 334 has not moved (e.g., has remained stationary for an amount of time (e.g., 700 ms) or a number of frames), the computing device 104 may scale 1306 a tracked hand 334 image to a fixed size. For example, the computing device 104 may scale 1306 the image or image data (captured using the camera 102) to particular dimensions (e.g., 40×40 pixels).

The computing device 104 may search 1308 the image for a finger pointing in a horizontal or vertical direction. For example, the computing device 104 may use a set of four Haar patterns (e.g., gesture patterns) to determine a pattern with a best fit in the scaled image. For instance, each pattern may comprise three rectangular regions or areas. A dark (e.g., dark gray) area or rectangle may be between two lighter (e.g., light gray) areas or rectangles. In other words, two lighter areas may adjoin the dark area on opposite sides of the dark area. One of the patterns may be vertically aligned, another pattern may be horizontally aligned and the remaining two patterns may be aligned at ±45° degree diagonals, for example. The dark area may represent a user's 332 finger, for example.

For example, the computing device 104 may use the scaled image or image data to compute an integral image (e.g., a summed area table) for use when a finger (e.g., index finger) is pointing in a horizontal or vertical direction. For example, the criterion for a selected (index) finger is that the average pixel value for the outer lighter areas should be larger than the average pixel value in the dark area plus one threshold (e.g., 30).

The computing device 104 may determine 1310 whether a finger in the horizontal or vertical patterns is found. If a finger is found, the search may be terminated and operation may return to monitoring 1302 hand tracking. However, if no finger in the horizontal or vertical patterns is found, the computing device 104 may search 1312 the image for a finger pointing in a diagonal direction. For example, the computing device 104 may compute a rotated integral image at +45 and −45 degrees. The computing device 104 may use the diagonal patterns to determine 1314 if a finger is found or detected. If a if the computing device determines 1314 that a finger is found, the computing device 104 may return to monitor 1302 hand tracking. If the computing device 104 determines 1314 that no finger is found using the filters, the computing device 104 may perform 1316 an operation. For example, the computing device 104 may determine that the hand 334 is closed (e.g., in a closed fist gesture), and that a closed hand 334 gesture corresponds to a "mouse-down" event. The computing device 104 may accordingly perform 1316 an operation by triggering the "mouse-down" event.

In order to improve the robustness of gesture recognition, a "voting" approach may be used. When recognizing a finger, for example, a number of frames (e.g., 20) may be buffered or stored. The computing device 104 may require that a minimum percentage (e.g., 80%) of the images in the buffer depict a hidden index finger before determining that the finger is hidden. Furthermore, the computing device 104 may require that another minimum percentage (e.g., 50%) of the frames searched must report the discovery of an index finger before determining that the index finger is extended. The lower threshold requirement for the extended versus hidden index figure may be used since a state machine that requires up-mouse events to be triggered only after a down-mouse event has been detected may be used. The state machine may serve as a filter to reduce false positives.

FIG. 14A is a diagram illustrating one example of a Haar pattern 1400*a* (e.g., gesture pattern) that may be used in accordance with the systems and methods disclosed herein. More specifically, the Haar pattern 1400*a* may be used to detect an extended finger. The Haar pattern 1400*a* comprises a rectangular dark area B 1460*b* adjoined by rectangular light area A 1458*a* and light area C 1458*c*. Dark area B 1460*b* may represent a user's 332 finger, for example. In particular, the Haar pattern 1400*a* illustrated in FIG. 14A may be used to detect a vertically extended finger.

FIG. 14B is a diagram illustrating another example of a Haar pattern 1400*b* (e.g., gesture pattern) that may be used in accordance with the systems and methods disclosed herein. More specifically, the Haar pattern 1400*b* may be used to detect an extended finger. The Haar pattern 1400*b* comprises a rectangular dark area B 1421*b* adjoined by rectangular light area A 1419*a* and light area C 1419*c*. Dark area B 1421*b* may represent a user's 332 finger, for example. In particular, the Haar pattern 1400*b* illustrated in FIG. 14B may be used to detect a diagonally extended finger (from lower right to upper left, for example). It may be observed that the Haar pattern 1400*b* illustrated in FIG. 14B is an example of a +45° rotated Haar pattern from the Haar pattern 1400*a* illustrated in FIG. 14A.

FIG. 14C is a diagram illustrating another example of a Haar pattern 1400*c* (e.g., gesture pattern) that may be used in accordance with the systems and methods disclosed herein. More specifically, the Haar pattern 1400*c* may be used to detect an extended finger. The Haar pattern 1400*c* comprises a rectangular dark area C 1425*b* adjoined by rectangular light area A 1423*a* and light area C 1423*c*. Dark area B 1425*b* may represent a user's 332 finger, for example. In particular, the Haar pattern 1400*c* illustrated in FIG. 14C may be used to detect a diagonally extended finger (from lower left to upper right, for example). It may be observed that the Haar pattern 1400*c* illustrated in FIG. 14C is an example of a −45° rotated Haar pattern from the Haar pattern 1400*a* illustrated in FIG. 14A.

FIG. 14D is a diagram illustrating another example of a Haar pattern 1400*d* (e.g., gesture pattern) that may be used in accordance with the systems and methods disclosed herein. More specifically, the Haar pattern 1400*d* may be used to detect an extended finger. The Haar pattern 1400*d* comprises a rectangular dark area D 1429*b* adjoined by rectangular light area A 1427*a* and light area C 1427*c*. Dark area D 1429*b* may represent a user's 332 finger, for example. In particular, the Haar pattern 1400*d* illustrated in FIG. 14D may be used to detect a horizontally extended finger.

In one configuration, Haar patterns that are the same and/or similar to the Haar patterns illustrated in FIGS. 14A-D may be used to detect an angle between a thumb and index finger. For example, a computing device 304 may search the image data (in a region next to the tracked hand (e.g., to the right or left, depending on which hand is used)) for a Haar pattern match to determine or estimate an angle between a user's 332 thumb and index finger. The image data may be searched to the left of the tracked hand 334, where a user 332 is using his/her right hand 334 (and/or has been instructed to use the right hand 334 by the computing device 304), for example. The image data may be searched, for example, when the user's hand 334 has stopped moving. One or more Haar patterns with different angles may be used. For example, patterns similar to the light-dark-light pattern 1400*a* illustrated in FIG. 14A at different rotations may be used. For example, patterns at rotations of 0, 15, 30, 45, 60, 75 and/or 90 degrees may be used. A pattern matching the image data may indicate an angle between the user's 332 thumb and index finger. This angle may be used to trigger an operation, such as moving or extending the cursor away from the user's hand 334 at a distance corresponding to the angle. For example, a 90 degree angle may correspond to a maximum extension in some distance (e.g., feet, pixels, percentage of distance to the edge of the projected image 330, etc.), while 0 or 15 degrees may correspond to a minimum or no extension, with intervening angles corresponding to a range of distances in between.

Figure 15:
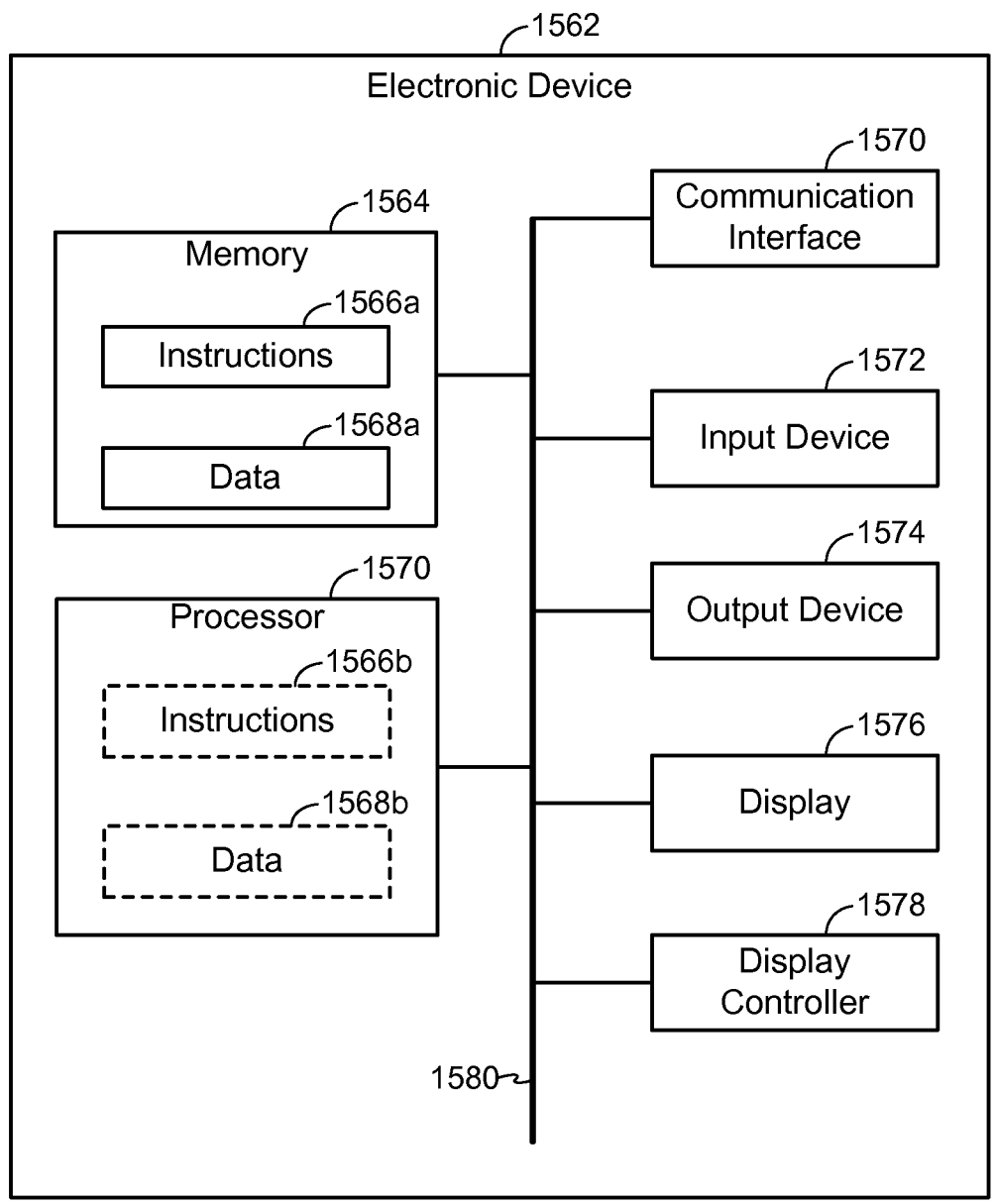
FIG. 15 illustrates various components that may be utilized in an electronic device.

FIG. 15 illustrates various components that may be utilized in an electronic device 1562. The illustrated components may be located within the same physical structure or in separate housings or structures. The electronic device 210 discussed in relation to FIG. 2 may be configured similarly to the electronic device 1562. Furthermore, the cameras 102, 202, 302, computing devices 104, 204, 304 and/or projectors 108, 208, 308 described above may each be configured similarly to the electronic device 1562. The electronic device 1562 includes a processor 1570. The processor 1570 may be a general purpose single- or multi-chip microprocessor (e.g., an ARM), a special purpose microprocessor (e.g., a digital signal processor (DSP)), a microcontroller, a programmable gate array, etc. The processor 1570 may be referred to as a central processing unit (CPU). Although just a single processor 1570 is shown in the electronic device 1562 of FIG. 15, in an alternative configuration, a combination of processors (e.g., an ARM and DSP) could be used.

The electronic device 1562 also includes memory 1564 in electronic communication with the processor 1570. That is, the processor 1570 can read information from and/or write information to the memory 1564. The memory 1564 may be any electronic component capable of storing electronic information. The memory 1564 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers and so forth, including combinations thereof.

Data 1568a and instructions 1566a may be stored in the memory 1564. The instructions 1566a may include one or more programs, routines, sub-routines, functions, procedures, code, etc. The instructions 1566a may include a single computer-readable statement or many computer-readable statements. The instructions 1566a may be executable by the processor 1570 to implement the methods 400, 500, 900, 1000, 1200, 1300 that were described above. Executing the instructions 1566a may involve the use of the data 1568a that is stored in the memory 1564. FIG. 15 shows some instructions 1566b and data 1568b being loaded into the processor 1570.

The electronic device 1562 may also include one or more communication interfaces 1570 for communicating with other electronic devices. The communication interfaces 1570 may be based on wired communication technology, wireless communication technology, or both. Examples of different types of communication interfaces 1570 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The electronic device 1562 may also include one or more input devices 1572 and one or more output devices 1574. Examples of different kinds of input devices 1572 include a keyboard, mouse, microphone, remote control device, button, joystick, trackball, touchpad, lightpen, etc. Examples of different kinds of output devices 1574 include a speaker, printer, etc. One specific type of output device which may be typically included in an electronic device 1562 is a display device 1576. Display devices 1576 used with configurations disclosed herein may utilize any suitable image projection technology, such as a cathode ray tube (CRT), liquid crystal display (LCD), light-emitting diode (LED), gas plasma, electroluminescence, or the like. A display controller 1578 may also be provided for converting data stored in the memory 1564 into text, graphics and/or moving images (as appropriate) shown on the display device 1576.

The various components of the electronic device 1562 may be coupled together by one or more buses, which may include a power bus, a control signal bus, a status signal bus, a data bus, etc. For simplicity, the various buses are illustrated in FIG. 15 as a bus system 1580. It should be noted that FIG. 15 illustrates only one possible configuration of an electronic device 1562. Various other architectures and components may be utilized.

Figure 16:
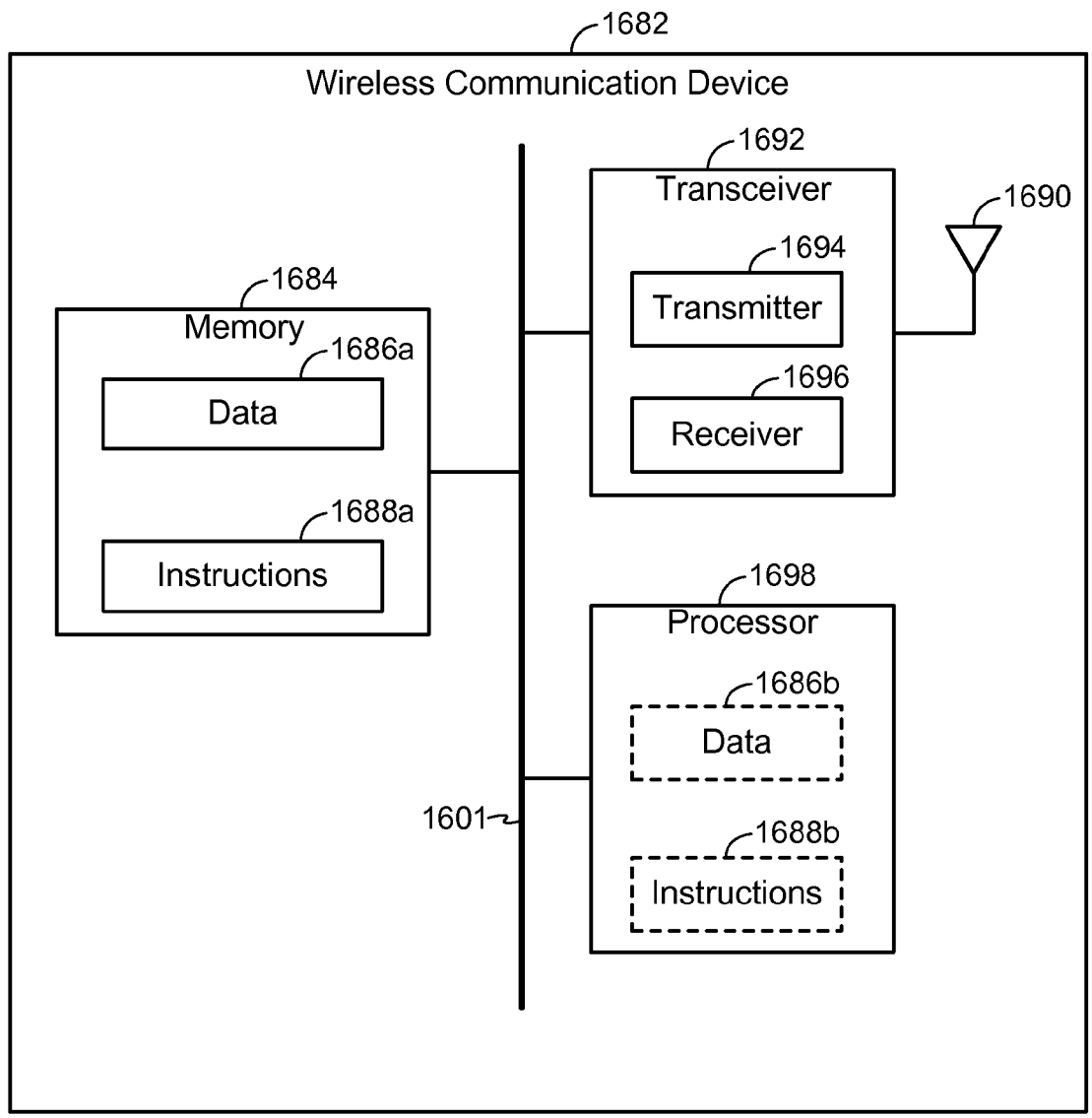
FIG. 16 illustrates certain components that may be included within a wireless communication device.

FIG. 16 illustrates certain components that may be included within a wireless communication device 1682. The wireless communication devices described previously may be configured similarly to the wireless communication device 1682 that is shown in FIG. 16. The wireless communication device 1682 includes a processor 1698. The processor 1698 may be a general purpose single- or multi-chip microprocessor (e.g., an ARM), a special purpose microprocessor (e.g., a digital signal processor (DSP)), a microcontroller, a programmable gate array, etc. The processor 1698 may be referred to as a central processing unit (CPU). Although just a single processor 1698 is shown in the wireless communication device 1682 of FIG. 16, in an alternative configuration, a combination of processors (e.g., an ARM and DSP) could be used.

The wireless communication device 1682 also includes memory 1684 in electronic communication with the processor 1698 (i.e., the processor 1698 can read information from and/or write information to the memory 1684). The memory 1684 may be any electronic component capable of storing electronic information. The memory 1684 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1686a and instructions 1688a may be stored in the memory 1684. The instructions 1688a may include one or more programs, routines, sub-routines, functions, procedures, etc. The instructions 1688a may include a single computer-readable statement or many computer-readable statements. The instructions 1688a may be executable by the processor 1698 to implement the methods 400, 500, 900, 1000, 1200, 1300 that were described above. Executing the instructions 1688a may involve the use of the data 1686a that is stored in the memory 1684. FIG. 16 shows some instructions 1688b and data 1686b being loaded into the processor 1698.

The wireless communication device 1682 may also include a transmitter 1694 and a receiver 1696 to allow transmission and reception of signals between the wireless communication device 1682 and a remote location (e.g., a base station or other wireless communication device). The transmitter 1694 and receiver 1696 may be collectively referred to as a transceiver 1692. An antenna 1690 may be electrically coupled to the transceiver 1692. The wireless communication device 1682 may also include (not shown) multiple transmitters, multiple receivers, multiple transceivers and/or multiple antenna.

The various components of the wireless communication device 1682 may be coupled together by one or more buses, which may include a power bus, a control signal bus, a status signal bus, a data bus, etc. For simplicity, the various buses are illustrated in FIG. 16 as a bus system 1601.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A computing device configured for providing an interface, comprising:
   a processor;
   memory in electronic communication with the processor; and
   instructions stored in the memory, the instructions being executable to:
      project a projected image from a projector;
      capture an image using a camera, wherein the camera operates in a visible spectrum;
      calibrate the computing device;
      detect a hand;
      track the hand by scanning a search space within the captured image for a tracking pattern representative of the hand, the search space size being based on the hand size, the hand size being determined by a change in intensity of a portion of the captured image; and
      perform an operation.

2. The computing device of claim 1, wherein calibrating the computing device comprises:
   finding corners of the projected image; and
   mapping coordinates of the projected image to a desktop space.

3. The computing device of claim 1, wherein calibrating the computing device comprises determining the hand size.

4. The computing device of claim 3, wherein the hand size is determined based on the projected image, wherein the projected image comprises a plurality of ellipses.

5. The computing device of claim 3, wherein the hand size is determined based on facial recognition.

6. The computing device of claim 1, wherein the hand is detected in an initial interaction area.

7. The computing device of claim 6, wherein the instructions are further executable to:
   track a body; and
   move the initial interaction area based on tracking the body.

8. The computing device of claim 1, wherein the instructions are further executable to determine that the tracking pattern is matched to a hand.

9. The computing device of claim 1, wherein the instructions are further executable to dynamically change the search space based on a motion of the hand.

10. The computing device of claim 1, wherein the tracking pattern comprises a rectangular center dark region adjoined on three sides by rectangular light outer regions and adjoined on one side by a rectangular dark outer region.

11. The computing device of claim 1, wherein the operation is performed based on tracking the hand.

12. The computing device of claim 1, wherein the instructions are further executable to recognize a hand gesture based on a gesture pattern.

13. The computing device of claim 12, wherein recognizing a hand gesture further comprises:
   determining whether a tracked hand has stopped moving for a period of time; and
   scaling a tracked hand image to a fixed size.

14. The computing device of claim 12, wherein the gesture pattern comprises a rectangular center dark region adjoined on two sides by rectangular light outer regions.

15. The computing device of claim 12, wherein the instructions are further executable to perform an operation based on the recognized hand gesture.

16. The computing device of claim 12, wherein the instructions are further executable to perform an operation when the hand gesture is recognized for a percentage of a number of frames.

17. The computing device of claim 12, wherein the hand gesture is recognized based on an angle between a thumb and index finger, and wherein the instructions are further executable to move a cursor away from the hand based on the angle between the thumb and index finger.

18. The computing device of claim 1, wherein the instructions are further executable to illuminate the projected image more brightly in a region around a hand.

19. The computing device of claim 1, wherein the instructions are further executable to track a plurality of hands.

20. The computing device of claim 1, wherein the instructions are further executable to recognize a plurality of hand gestures.

21. The computing device of claim 1, wherein the instructions are further executable to remove dark portions of the image before tracking the hand to avoid tracking a shadow of the hand.

22. The computing device of claim 1, wherein the instructions are further executable to provide improved focus and exposure of the image in an area of the projected image.

23. The computing device of claim 15, wherein the operation releases a cursor.

24. A method for providing an interface, comprising:
projecting a projected image from a projector;
capturing an image using a camera, wherein the camera operates in a visible spectrum;
calibrating a computing device;
detecting, by the computing device, a hand;
tracking, by the computing device, the hand by scanning a search space within the captured image for a tracking pattern representative of the hand, the search space size being based on the hand size, the hand size being determined by a change in intensity of a portion of the captured image; and
performing an operation by the computing device.

25. The method of claim 24, wherein calibrating the computing device comprises:
finding corners of the projected image; and
mapping coordinates of the projected image to a desktop space.

26. The method of claim 24, wherein calibrating the computing device comprises determining the hand size.

27. The method of claim 26, wherein the hand size is determined based on the projected image, wherein the projected image comprises a plurality of ellipses.

28. The method of claim 26, wherein the hand size is determined based on facial recognition.

29. The method of claim 24, wherein the hand is detected in an initial interaction area.

30. The method of claim 29, further comprising:
tracking a body; and
moving the initial interaction area based on tracking the body.

31. The method of claim 24, further comprising determining that the tracking pattern is matched to a hand.

32. The method of claim 24, further comprising dynamically changing the search space dynamically based on a motion of the hand.

33. The method of claim 24, wherein the tracking pattern comprises a rectangular center dark region adjoined on three sides by rectangular light outer regions and adjoined on one side by a rectangular dark outer region.

34. The method of claim 24, wherein the operation is performed based on tracking the hand.

35. The method of claim 24, further comprising recognizing a hand gesture based on a gesture pattern.

36. The method of claim 35, wherein recognizing a hand gesture further comprises:
determining whether a tracked hand has stopped moving for a period of time; and
scaling a tracked hand image to a fixed size.

37. The method of claim 35, wherein the gesture pattern comprises a rectangular center dark region adjoined on two sides by rectangular light outer regions.

38. The method of claim 35, further comprising performing an operation based on the recognized hand gesture.

39. The method of claim 35, further comprising performing an operation when the hand gesture is recognized for a percentage of a number of frames.

40. The method of claim 35, wherein the hand gesture is recognized based on an angle between a thumb and index finger, and the method further comprises moving a cursor away from the hand based on the angle between the thumb and index finger.

41. The method of claim 24, further comprising illuminating the projected image more brightly in a region around a hand.

42. The method of claim 24, further comprising tracking a plurality of hands.

43. The method of claim 24, further comprising recognizing a plurality of hand gestures.

44. The method of claim 24, further comprising removing dark portions of the image before tracking the hand to avoid tracking a shadow of the hand.

45. The method of claim 24, further comprising providing improved focus and exposure of the image in an area of the projected image.

46. The method of claim 38, wherein the operation releases a cursor.

47. A computer-program product for providing an interface, the computer-program product comprising a non-transitory tangible computer-readable medium having instructions thereon, the instructions comprising:
code for causing a computing device to project a projected image from a projector;
code for causing the computing device to capture an image using a camera, wherein the camera operates in a visible spectrum;
code for causing the computing device to calibrate the computing device;
code for causing the computing device to detect a hand;
code for causing the computing device to track the hand by scanning a search space within the captured image for a tracking pattern representative of the hand, the search space size being based on the hand size, the hand size being determined by a change in intensity of a portion of the captured image; and
code for causing the computing device to perform an operation.

48. The computer-program product of claim 47, wherein the hand is detected in an initial interaction area.

49. The computer-program product of claim 47, wherein the instructions further comprise code for causing the computing device to recognize a hand gesture based on a gesture pattern.

50. An apparatus for providing an interface, comprising:
means for projecting a projected image from a projector;
means for capturing an image using a camera, wherein the camera operates in a visible spectrum;
means for calibrating the apparatus;
means for detecting a hand;
means for tracking the hand by scanning a search space within the captured image for a tracking pattern representative of the hand, the search space size being based on the hand size, the hand size being determined by a change in intensity of a portion of the captured image; and means for performing an operation.

51. The apparatus of claim 50, wherein the hand is detected in an initial interaction area.

52. The apparatus of claim 50, further comprising means for recognizing a hand gesture based on a gesture pattern.

* * * * *